United States Patent [19]

Zemke, deceased et al.

[11] Patent Number: 4,697,246
[45] Date of Patent: Sep. 29, 1987

[54] METHOD AND APPARATUS FOR DETECTING THE ENGAGEMENT OF A PROPER NUMBER OF ARTICLES

[75] Inventors: Edward H. Zemke, deceased, late of Chicago, by Anne H. Zemke, legal representative; Gary L. Vandersyde, Naperville; K. George Rabindran, Morton Grove; Kenneth L. Guenther, Park Ridge, all of Ill.

[73] Assignee: Bell & Howell Company, Chicago, Ill.

[21] Appl. No.: 648,399

[22] Filed: Sep. 7, 1984

[51] Int. Cl.⁴ .................. B25J 15/02; G01B 5/02; B65H 5/10; B65H 3/32; B65H 7/06
[52] U.S. Cl. .................. 364/563; 33/147 N; 33/148 H; 271/9; 271/263; 271/268; 294/907; 901/32; 901/46; 364/551
[58] Field of Search .............. 364/563, 551; 324/207, 324/208; 901/33, 34, 35, 31, 32, 38, 46; 271/9, 263, 267, 268, ; 414/1, 730; 33/148 H, 147 N, 149 J, 143 L; 294/65.5, 907

[56] References Cited

U.S. PATENT DOCUMENTS

| | | | |
|---|---|---|---|
| 3,371,331 | 2/1968 | Buckholz | 340/259 |
| 3,744,787 | 7/1973 | Morrison | 270/56 |
| 3,885,780 | 5/1975 | Morrison | 270/56 |
| 3,892,043 | 4/1975 | Bonikowski | 33/143 L |
| 4,066,969 | 1/1978 | Pearce et al. | 328/5 |
| 4,203,586 | 5/1980 | Hoyer | 271/34 |
| 4,243,216 | 1/1981 | Mazumder | 271/263 |
| 4,258,326 | 3/1981 | Johne | 328/5 |
| 4,391,439 | 7/1983 | Edstrom | 271/90 |
| 4,426,785 | 1/1984 | Loftus et al. | 33/147 L |
| 4,428,041 | 1/1984 | Honkawa | 364/183 |
| 4,447,885 | 5/1984 | Biss | 364/568 |
| 4,506,880 | 3/1985 | Dixon et al. | 271/263 |

OTHER PUBLICATIONS

Hall Effect Transducers, pp. 34–35, 38–39 (1982).

Primary Examiner—Errol A. Krass
Assistant Examiner—Daniel W. Juffernbruch
Attorney, Agent, or Firm—Griffin, Branigan & Butler

[57] ABSTRACT

Method and apparatus for detecting article engagement errors and for calibrating engagement error detection apparatus associated with a plurality of gripper arms (16) of an insertion machine (10). Gripper arms (16) at each of a plurality of insert stations S comprise a first jaw member (24) and a second jaw member (26) which selectively engage articles therebetween. Field-generating means (420) is mounted on one jaw member while a Hall Effect sensor (400) is connected on the other jaw member. The sensed flux density of the generated field is a function of the relative displacement of the first and second jaw members (24,26). A signal generated by the sensor (400) operated in a slide-by mode is related to the separation of the first jaw member (24) and second jaw member (26). If the sensor-generated signal is within predetermined limits of a stored reference signal a proper number of articles are engaged between the first and second jaw members (24,26). The reference signal is stored for each insert station S in accordance with a method and apparatus for calibrating an engagement error detector (364) associated with the station S. The engagement error detectors for a plurality of insert stations can be calibrated one-at-a-time in serial fashion or, in an alternate mode, essentially simultaneously using a master calibration switch (MCS).

26 Claims, 21 Drawing Figures

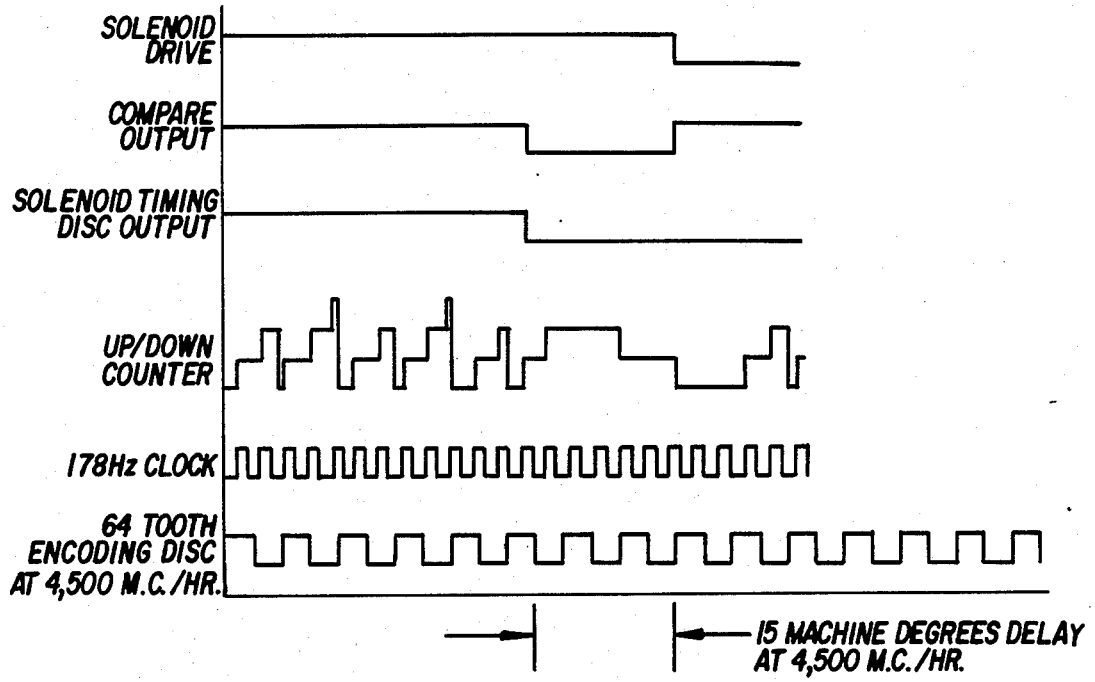
FIG. 4 TIMING DIAGRAM (4,500 MACHINE CYCLES PER HOUR)
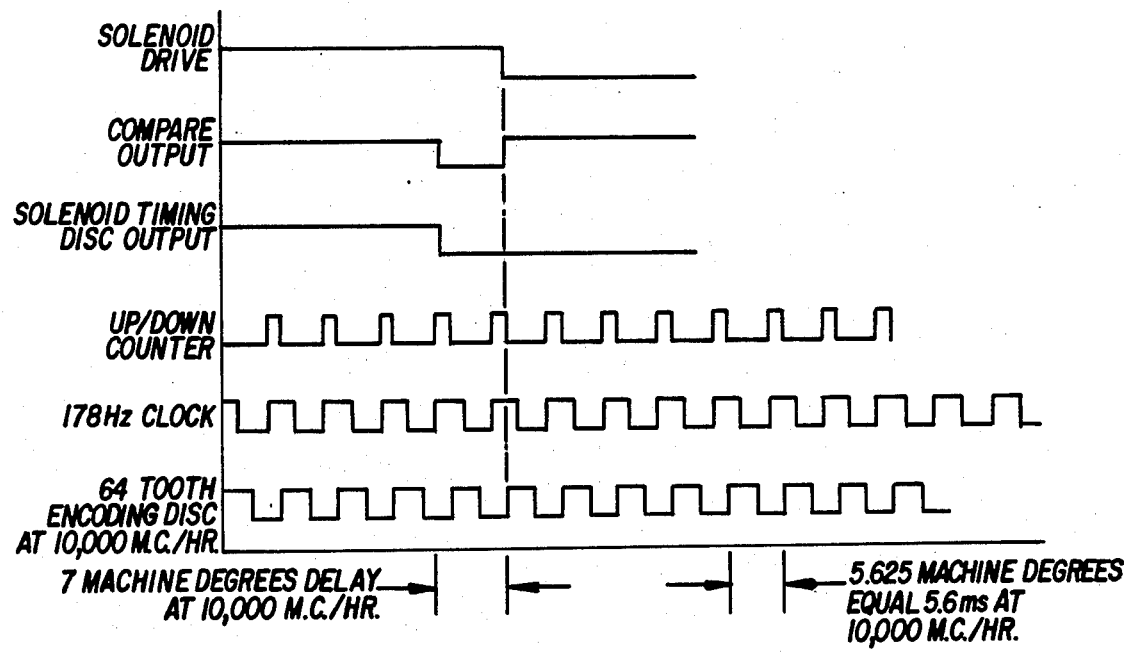
FIG. 5 TIMING DIAGRAM (10,000 MACHINE CYCLES PER HOUR)

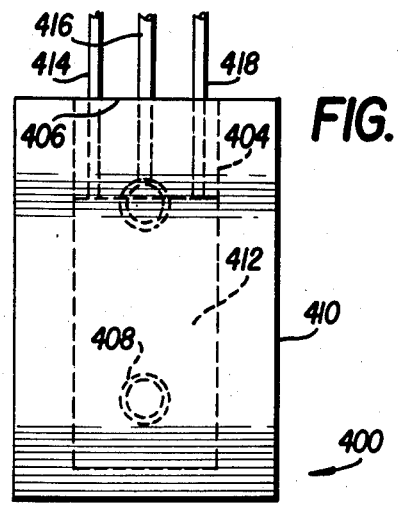
FIG. 6A
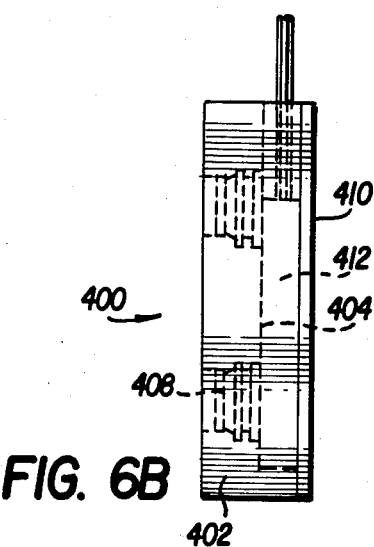
FIG. 6B
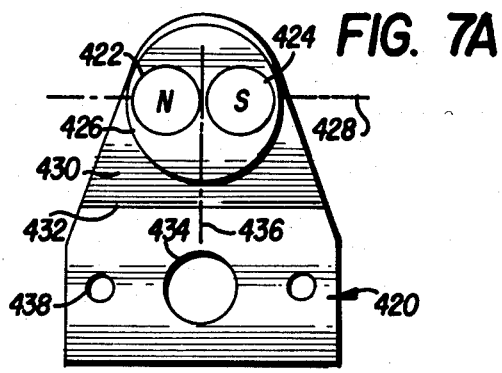
FIG. 7A
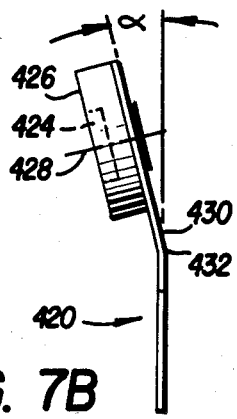
FIG. 7B
FIG. 9
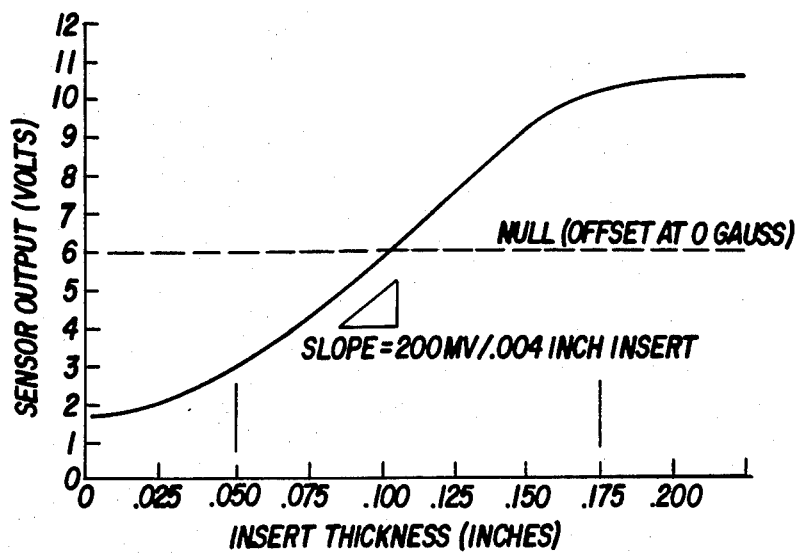

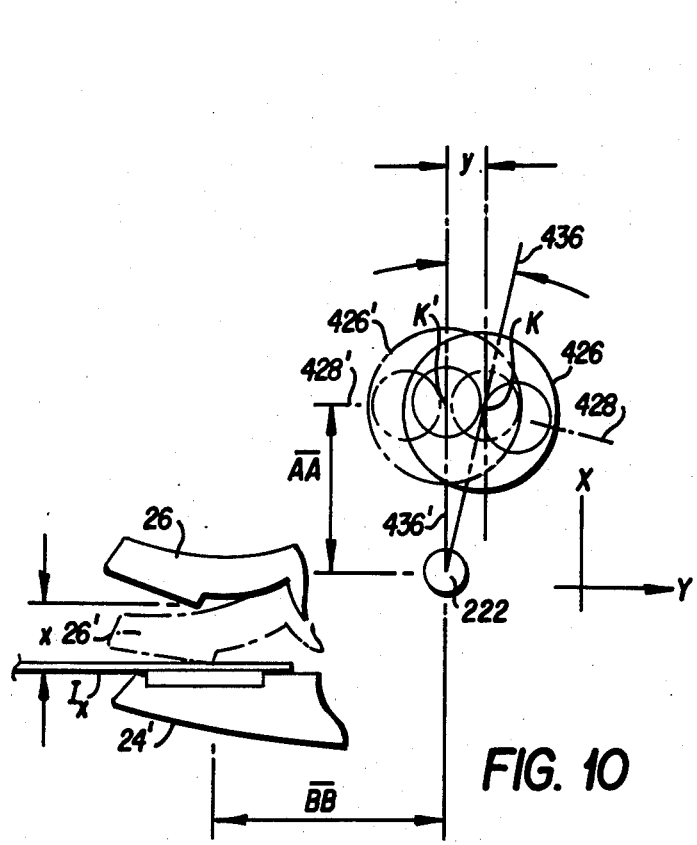
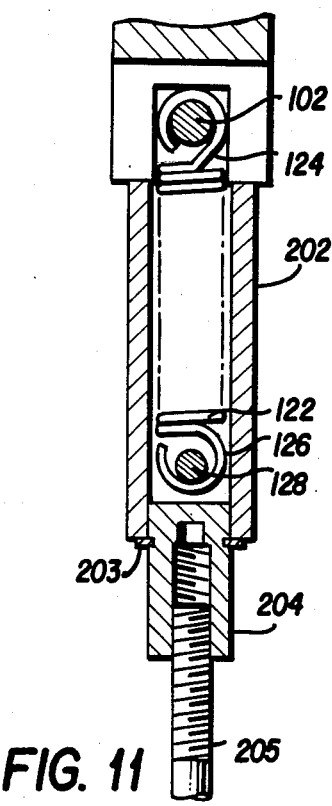
FIG. 10  FIG. 11
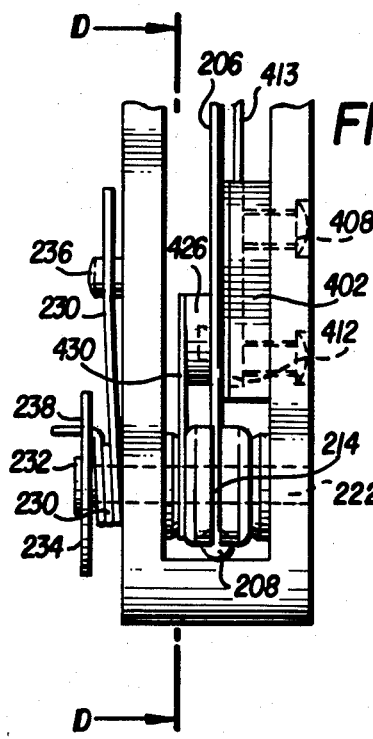
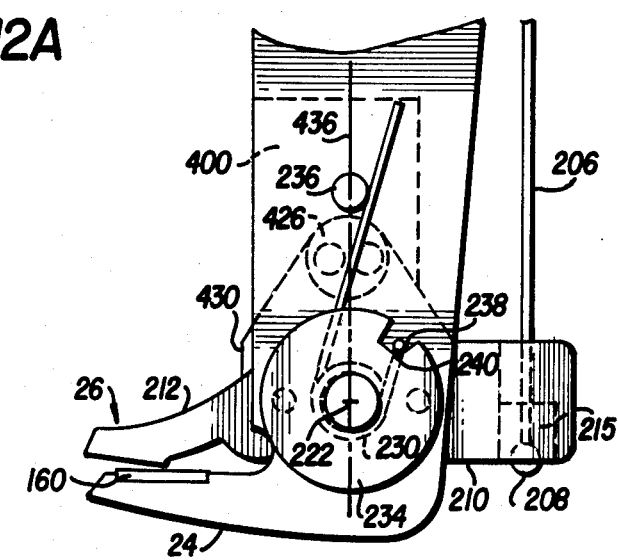
FIG. 12A  FIG. 12B

METHOD AND APPARATUS FOR DETECTING THE ENGAGEMENT OF A PROPER NUMBER OF ARTICLES

This invention pertains to a method and apparatus for handling articles such as documents or sheets, and particularly to a method and apparatus for determining whether a proper number of sheets are engaged between the jaws of a document sheet feeder.

One environment wherein the present invention finds application is the document handling art. In document handling it is often required to grip a document between two jaw-like members and then to transport the gripped document from a first position to a second position. U.S. Pat. No. 2,325,455 to A. H. Williams, incorporated herein by reference, includes a discussion of a document handling operation of this type in the disclosure of an insertion machine. The Williams apparatus discloses a gripper arm which has both fixed and movable jaw members. In apparatus of this type the fixed jaw member is usually integral with the gripper arm while the movable jaw is selectively operated so that items, such as documents or inserts, can be engaged between and released from the two jaws.

It is generally required that document handling gripper arms such as that described above engage a specified number of items at a given point in time. In most situations, for example, it is desirable that a gripper arm engage one document at a time. It is possible, however, that an improper number of items may instead be engaged. In this regard, a gripper arm may fail to engage any items at all or too few items (resulting in a "miss") or may engage too many items (resulting in a "double" or the like).

The failure of a document handling gripper arm or the like to engage a proper number of items should be determined and, in many situations, be communicated either to an operator or to a system including the particular document handling apparatus. To this end, insertion machines have employed various "mistake" detectors. One such detector is disclosed in U.S. Pat. No. 3,744,787 to Morrison wherein an indicator element is electrically conductive and rotatably mounted at the lower end of a gripper arm. The indicator element is biased by a leaf spring which rotates a biasing arm and thereby an indicator element in a clockwise direction. The upper end of the indicator element has a horseshoe or "U" shape which indicates whether the gripper jaws make a "miss" or a "double". In this regard, there is an electrical contact point on each side of the inside of the horseshoe's mouth, one being the "double" contact point and the other being the "miss" contact point. Electrical contact in the event of a "miss" or a "double" causes the activation of a suitable alarm or cut-off control.

Another mistake detector for an insertion machine is disclosed in U.S. Pat. No. 3,885,780 to Morrison, wherein an indicator leaf spring mounted on a clamped arm of a gripper arm makes contact with a lower end of a detector leaf spring when a "miss" occurs. In the event of a "double", the indicator leaf spring makes contact with a contact point of an adjusting screw.

Insertion machines may handle several jobs a day with the types, and hence the thicknesses, of the insert documents at a given insert station varying from job to job. In addition, the type and thicknesses of the insert documents usually vary from station to station for the same job. Hence, mistake detectors for an insertion machine must generally be calibrated for each insert station for each job. Calibration in the past has proven delicate and time consuming inasmuch as precise mechanical adjustments must be made for the mistake detector apparatus at each station for each job. At the beginning of each new job skilled technicians have heretofore had to spend precious machine down time slowly moving from station to station making painstaking, precision adjustments to the mistake detector at each station.

It is an object of the present invention to provide mistake detection apparatus and methods for an article handling apparatus wherein an accurate indication of the number of articles engaged between gripper jaws is provided.

An advantage of the present invention is the provision of easy and accurate methods and apparatus for calibrating a mistake detector for an article handling apparatus.

A further advantage of the present invention is the provision of apparatus and methods whereby mistake detectors for a plurality of insert stations can be calibrated one-at-a-time in serial fashion or essentially simultaneously.

Yet another advantage of the present invention is the provision of a mistake detector which can be easily utilized and calibrated by a lay operator.

SUMMARY

Method and apparatus for detecting article engagement errors and for calibrating engagement error detection apparatus associated with a plurality of gripper arms of an insertion machine. Gripper arms at each of a plurality of insert stations comprise a first jaw member and a second jaw member. The second jaw member is movable toward and away from a first jaw member to selectively engage articles therebetween. Field-generating means is mounted on one jaw member while a sensor is connected on the other jaw member. The signal generated by the sensor is indicative of the flux density of the field created by the generating means. The sensed flux density of the generated field is a function of the relative displacement of the first and second jaw members. The signal generated by the sensor is accordingly related to the separation of the first jaw member and second jaw member. If the sensor-generated signal is within predetermined limits of a stored reference signal a proper number of articles are engaged between the first and second jaw members.

In one embodiment of the invention the field-generating means is magnetic means and the sensor is a Hall Effect sensor. The magnetic means is mounted on a movable jaw member of an insertion machine while the sensor is connected to the other jaw member. In this regard, "connected to the other jaw member" means that the sensor can be directly mounted on the jaw member or mounted on gripper jaw structure to which the jaw member is connected. The magnetic means and sensor are so positioned with respect to one another that the magnetic means "slides by" the sensor as the movable jaw member is displaced relative to the other jaw member. The voltage generated by the sensor is related to the magnitude of the displacement of the two jaw members.

Methods of the present invention provide for the relatively easy calibration and adjustment of one or more engagement error or double/miss mistake detectors of an insertion machine. Means are provided for sensing the relative displacement of the gripper jaws and for generating an electrical signal proportional thereto. When a proper number of documents are engaged by the gripper arm, the signal proportional to the proper relative displacement of the gripper is stored electrically as a calibrated reference signal. Thereafter, when it is desirable to detect a double or a miss, the stored reference signal is compared to signals proportional to limits for acceptable jaw displacement and an error signal is generated when either of the limit signals are outside predetermined limits. The mistake detectors for a plurality of insert stations can be calibrated one-at-a-time in serial fashion or, in an alternate mode, essentially simultaneously using a master calibration switch.

BRIEF DESCRIPTION OF THE DRAWINGS

The foregoing and other objects, features, and advantages of the invention will be apparent from the following more particular description of the preferred embodiments as illustrated in the accompanying drawings in which reference characters refer to the same parts throughout the various views. The drawings are not necessarily to scale, emphasis instead being placed upon illustrating the principles of the invention.

FIG. 4 is a graph showing various parameters as functions of machine cycles when a machine is operating at 4,500 cycles per hour;

FIG. 5 is a graph showing various parameters as functions of machine cycles when a machine is operating at 10,000 cycles per hour;

FIGS. 6A and 6B are rear and side views, respectively, of a Hall Effect device according to an embodiment of the invention;

FIGS. 7A and 7B are front and side views, respectively, of magnetic means according to an embodiment of the invention;

FIG. 9 is a graph showing output voltage from a Hall Effect sensor as a function of insert thickness according to an embodiment of the invention;

FIG. 10 is a schematic diagram depicting the relationships of jaw members and magnetic means relative to a pivot point;

FIG. 11 is a detailed view of a portion of the gripper arm of FIG. 1A;

FIG. 12A is a detailed rear view of a portion of the gripper arm of FIG. 1A;

FIG. 12B is a detailed view of a portion of the gripper arm of FIG. 12A cut along the line "D";

DETAILED DESCRIPTION OF THE DRAWINGS

Figure 1:
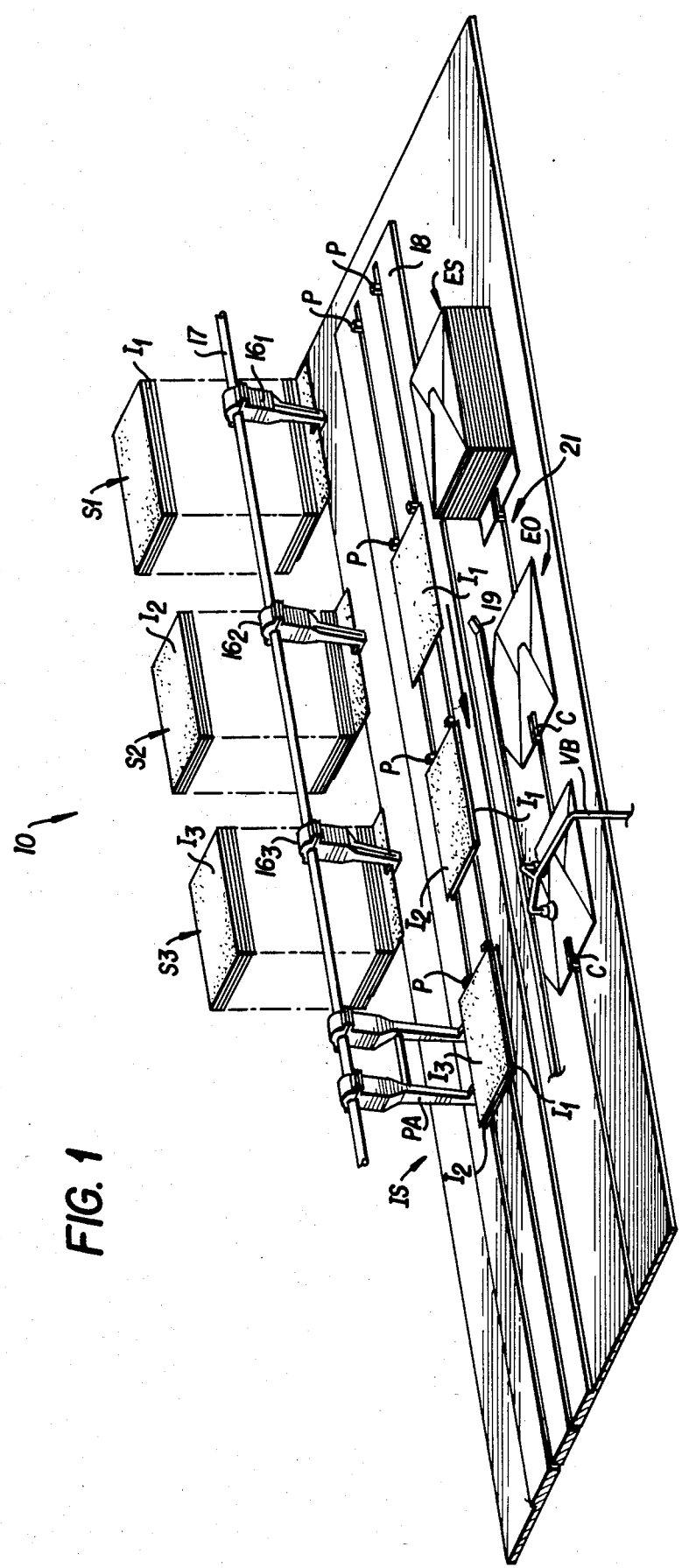
FIG. 1 is a diagrammatical view of portions of an insertion machine according to an embodiment of the invention.

Referring to FIG. 1, there is shown an insertion machine 10 which collects a plurality of inserts into a pile and transports that pile to an inserting station IS; conveys an open envelope to inserting station IS; and, then inserts the pile of inserts into the envelope. During steps unillustrated in FIG. 1 the insertion machine 10 later seals the envelope and processes the envelope for mailing. It will be appreciated that the operation of machine 10 is timed in accordance with a machine cycle. In this respect, an individual envelope requires several machine cycles to be processed. With the exception of a few initial or start-up machine cycles, a pile of inserts is inserted into an awaiting corresponding envelope at the end of each machine cycle.

In order for insertion machine 10 to collect a pile of inserts at inserting station IS, there are provided therein a plurality of insert stack stations or hoppers S1, S2, and S3 and a plurality of corresponding gripper arms $16_1$, $16_2$, $16_3$ each mounted to a shaft 17 which extends over an insert raceway 18. Insert station S1, gripper arm $16_1$, and shaft 17 serve to withdraw one insert from the stack of inserts and drop that insert onto raceway 18. More particularly, insert station S1 holds a stack of inserts $I_1$ in a manner whereby the bottommost insert is separable from the rest of the stack. Gripper arm $16_1$ is connected to shaft 17 which oscillates once during a portion of each machine cycle in order to rotate arm $16_1$ toward and away from the stack of inserts. While rotating toward the stack, the jaws of gripper arm $16_1$ are opened to allow the arm to engage the bottommost insert. When the shaft 17 stops moving arm $16_1$ toward the stack, the jaws are closed to engage the bottommost insert. Shaft 17 then rotates gripper arm $16_1$ away from the stack, thereby withdrawing the insert from the bottom of the stack. Gripper arm $16_1$ then opens its jaws to release the insert which falls onto insert raceway 18. Thus, insert station S1, gripper arm $16_1$, and shaft 17 cooperate to withdraw one insert from the stack and drop that insert onto raceway 18.

Insert raceway 18 includes a plurality of pairs of pusher pins P which are mounted on a pair of chains (not shown) which are periodically driven by machine 10. The chains are driven once during a portion of each machine cycle and move the pusher pins P to the next insert station. After the just-described dropping of an insert from station S1 onto raceway 18, for example, pins P push the insert to the vicinity of the insert station S2 and stop.

In view of the foregoing, it will be seen that insert station S1, gripper arm $16_1$, shaft 17, and raceway 18 cooperate to withdraw one insert from the stack and convey that insert to station S2. It will be appreciated that for the embodiment shown one insert from station S1 is conveyed to station S2 each machine cycle.

Insert station S2, gripper arm $16_2$, and shaft 17 cooperate in a similar manner as insert station S1, gripper arm $16_1$, and shaft 17 and serve to withdraw one insert from the stack of inserts at station S2 and drop that insert onto raceway 18. More particularly, insert stack station S2 holds a stack of inserts $I_2$ in a manner whereby the bottommost insert is separable from the rest of the stack. Gripper arm $16_2$, which is also connected to oscillating shaft 17, rotates toward the bottommost insert; grabs that insert; rotates away from the stack; and, then releases the insert. This insert falls onto insert raceway 18 which already contains an insert $I_1$. Pusher pins P of raceway 18 advance this pile to the next insert station. Thus, during another machine cycle, insert station S2, gripper arm $16_2$, shaft 17, and raceway 18 cooperate to add an insert $I_2$ to insert $I_1$ and convey the pile to station S3.

Insert station S3, gripper arm $16_3$, and shaft 17 cooperate in a similar manner as insert stations S1 and S2, gripper arms $16_1$ and $16_2$, and shaft 17 and serve to withdraw one insert from the stack of inserts at station S3 and drop that insert onto raceway 18. Insert stack station S3 separates the bottommost insert from the rest of a stack of inserts I3. Gripper arm $16_3$ rotates toward the bottommost insert; grabs that insert; rotates away from the stack; and, releases the insert onto inserts $I_1$ and $I_2$ on raceway 18. This thereby completes the pile of inserts. Raceway 18 then conveys the completed pile to inserting station IS. Thus, during a third machine cycle, insert station S3, gripper arms $16_3$, shaft 17, and raceway 18 cooperate to add an insert $I_3$ to a pile of inserts and convey the pile to inserting station IS.

In view of the foregoing, it will be seen that insert stack stations S1, S2, and S3, respective gripper arms $16_1$, $16_2$, and $16_3$, and insert raceway 18 cooperate to collect a pile of inserts and convey that pile to inserting station IS in three machine cycles.

As mentioned above, insertion machine 10 conveys an open envelope to inserting station IS. To this end there are provided an envelope stack station ES; an envelope flap opening station EO; a flap hold down bar 19; and, an envelope raceway 21. Envelope stack station ES holds a stack of envelopes; separates the bottommost envelope from the rest of the stack; and, feeds the envelope to a clamp C in envelope raceway 21. Envelope raceway 21 includes clamp C which is mounted on a chain (not shown) which is periodically driven by machine 10. The chain is driven once during a portion of each machine cycle and moves the envelope to an envelope flap opening station EO. At station EO, a sucker cup (not shown) rotates toward the closed flap of an envelope, applies a vacuum to the flap and rotates away from the envelope in order to open the flap of the envelope. The raceway 21 then moves the envelope to the inserting station IS while the flap of the envelope is held down by bar 19.

When an envelope and a pile of inserts are at inserting station IS, insertion machine 10 inserts the pile of inserts into the opened envelope. To this end, there are provided in machine 10, a pusher arm PA, and a vacuum bar VB. The vacuum bar VB lifts up the back (top) side of the envelope and shaft 17 rotates and thereby moves pusher arm PA toward the opened envelope. As a result, the pile of inserts will be pushed into the envelope. Thus, pusher arm PA and vacuum bar VB cooperate to insert a pile of inserts into an opened envelope at inserting station IS.

Although FIG. 1 shows an insertion machine with three insert stack stations S1, S2, and S3, it should be understood that the number of insert stack stations is not critical to the present invention and that in other embodiments fewer or more such insert stations are employed along a suitable raceway.

As discussed hereinbefore, during the operation of machine 10 it is highly desirable to provide an indication when one of the gripper arms grips too few or too many inserts. Insertion machine 10 includes an improved double/miss detector which is relatively easy to calibrate and adjust and which is described in detail below.

In addition, it should be appreciated that it is desirable to provide a reliable gripper arm. Insertion machine 10 includes a reliable gripper arm which will now be described.

GRIPPER ARM MECHANICAL STRUCTURE

Figure 1A:
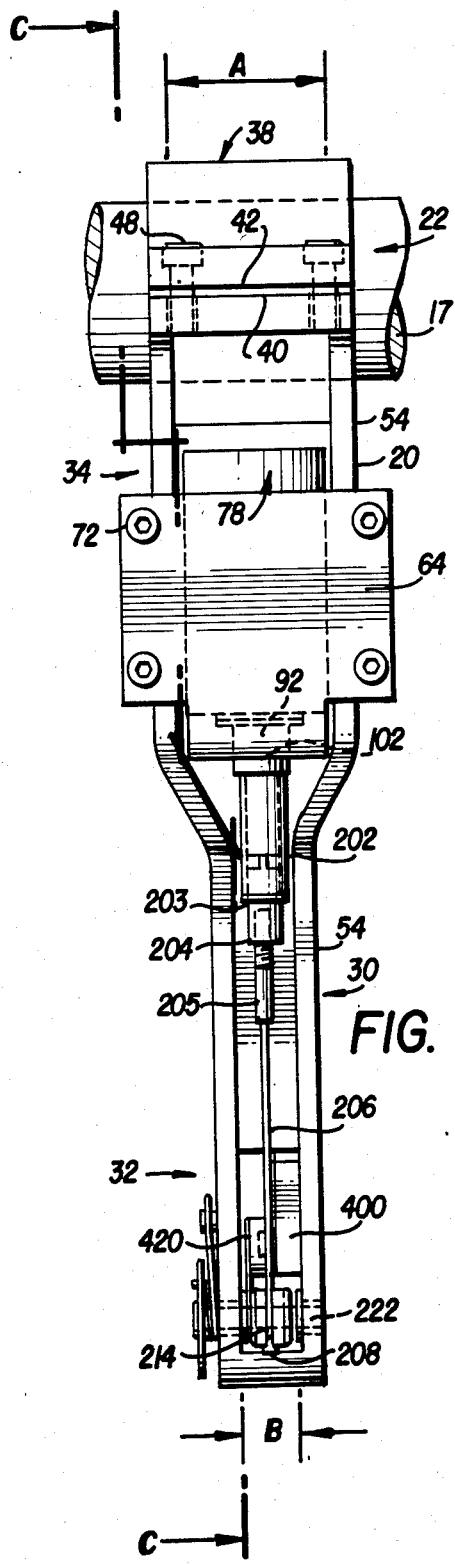
FIG. 1A is a rear view of a gripper arm according to an embodiment of the invention.
Figure 1B:
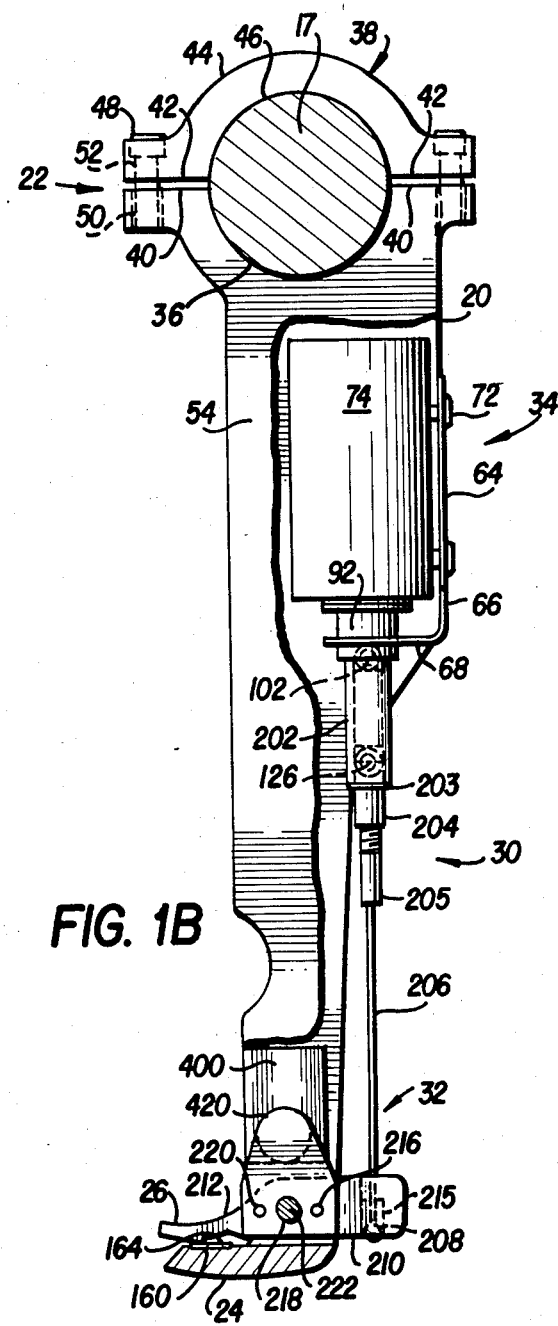
FIG. 1B is a side view taken along the line "C" of the gripper arm of FIG. 1A.
Figure 2:
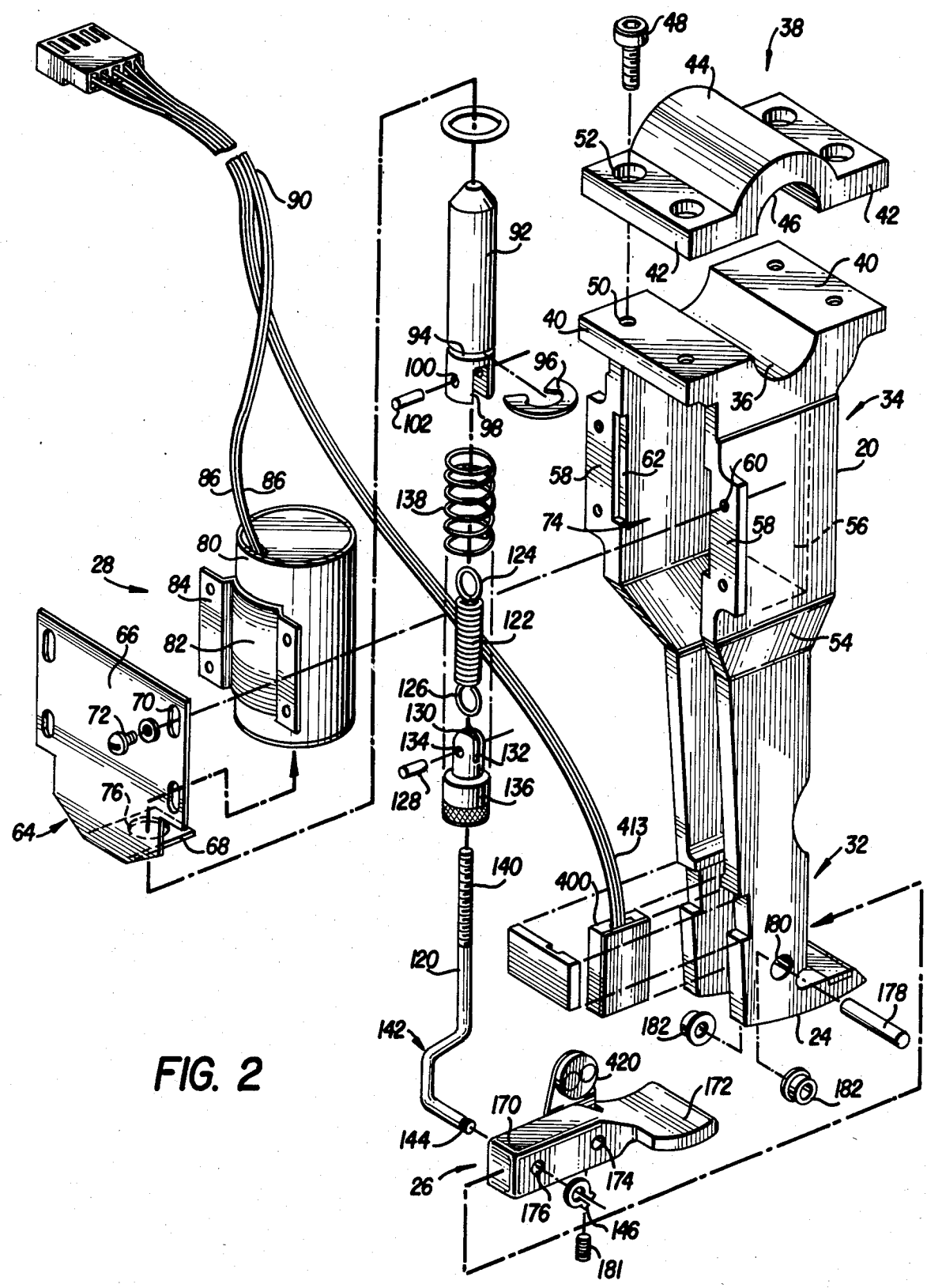
FIG. 2 is an exploded view of the gripper arm of another embodiment of the invention.

Each gripper arm 16 according to an embodiment of the invention includes a housing 20; securing means 22 for securing the gripper arm to oscillating drive means such as shaft 17; a first article-contacting or jaw member 24; a second article-contacting or jaw member 26; jaw actuation means, such as solenoid actuation means 28; and, linkage means 30. FIGS. 1A and 1B (as well as FIGS. 11, 12A, and 12B) show a gripper arm according to one embodiment of the invention while FIG. 2 shows a gripper arm of a second embodiment which is generally similar to the embodiment of FIG. 1 but which includes different structure for its linkage means. Structural elements common to the embodiments of FIGS. 1A and 1B and FIG. 2 are assigned the same reference numerals for description purposes hereinafter.

Gripper arm housing 20 has a distal end 32 and a proximal end 34. The means 22 for securing the gripper arm to the oscillating drive shaft 17 includes (1) a semicylindrical recess 36 at the top of the proximal end 34 of the gripper arm housing 20, and (2) a clamp member 38. The recess surface 36 is contiguous with flanges 40 on either side of the recess 36. The flanges are generally parallel to the major cylindrical axis of the recess 36. The clamp member 38 mates with the proximal end 34 of the housing 20. The clamp 38 is formed with comparable flanges 42 which mate with the flanges 40 of housing 20. The clamp 38 has a cylindrical sector portion 44 which forms a semi-cylindrical recess 46. Each of the flanges 40 and 42 have two threaded apertures therein appropriately aligned to receive threaded fasteners 48. In this respect, flanges 40 have apertures 50 and flanges 42 have apertures 52. The fasteners 48 secure clamp 38 to the proximal end 34 of the housing 20 so that the gripper arm is clamped onto the oscillating drive shaft 17. Each threaded fastener 48 extends through the aligned apertures 50,52 and the housing flanges 40 and the clamp flanges 42, respectively.

The gripper arm housing 20 comprises opposing side panels 54 which extend the height of the gripper arm. The two side panels 54 define a space therebetween. At the proximal end 34 of the gripper arm housing 20 the side panels 54 are parallel and separated by a distance A as shown in FIG. 1A. At the mid-section of the gripper arm housing the side panels 54 begin to converge to one another but separate before doing so and continue in parallel manner to the distal end 34 of the housing 20. At the distal end of the housing the side panels 54 are spaced apart at a distance B which is less than distance A as shown in FIG. 1A.

In the region where the side panels 54 are separated by the distance A, a front panel 56 is integral with the side panels 54. In this region where the side panels 54 are separated by the distance A, each side panel 54 has at its back a perpendicularly extending flange 58. Each flange 58 has two threaded apertures 60 therethrough, as well as a vertically extending channel 62 at the intersection of the plane which includes the interior surface of the housing-side panel 54 and the plane which includes the flange 58.

The gripper arm housing 20 also includes a backplate 64 which has a back member 66 and a base member 68 perpendicular thereto. The back member 66 has four apertures 70. Two of the apertures 70 are on each side of the back member 66, each aperture 70 being aligned with apertures 60 on the side panel flanges 58 when the back member is assembled to housing 20. Threaded fasteners 72 extend through the apertures 70 of backplate 64 and through the aperture 60 of the side panel flanges 58 to secure the backplate 64 to the gripper arm housing 20. The base member 68 of the backplate 64 is adapted for placement between the side panels 54 in an area where the side panels begin to converge.

As described above, the side panels 54, front plate 56, back member surface 56, and backplate base member 58 generally define a hollow volume 74. Volume 74 is not totally confined, however, inasmuch as the base member 68 of the backplate 64 has an aperture 76 therein and the height of the back member 66 of backplate 64 is such as to leave an essentially rectangular gap 78 above the backplate 64.

Volume 54 houses the jaw actuating means which, in the illustrated embodiment, is solenoid means 28. The solenoid means 28 has an essentially cylindrical casing 80. Solenoid casing 80 has a mounting plate 82 secured thereto. In the embodiment shown, the mounting plate 82 has protrusions 84 thereon adapted to fit into the channel 62 of the side panel flanges 58. As shown in FIG. 2, electrical leads 86 extend from the interior of the solenoid casing 80 and are included in a ribbon-type cable 90. Although not shown as such in FIG. 1A, it should be understood that the ribbon cable 90 extends from the volume 74 out through the rectangular gap 78 on the back of the gripper arm and is connected to appropriate circuitry including the type of circuit shown in FIG. 3. The circuitry to which the ribbon cable 90 is connected resides on a circuit board or the like situated elsewhere on the particular machine in conjunction with which the gripper arm of the invention operates.

The solenoid means 28 also comprises a plunger means 92. Near its base plunger means 92 has an annular groove about which C-clamp retainer 96 fits. The lower end of the plunger 92 has a slot 98 therein through the diameter of the plunger 92. The plunger 92 also has an aperture 100 extending therethrough along a diameter of the plunger 92 which is transverse to the slot 98. The plunger aperture 100 is adapted to receive a rollpin 102.

Turning now to the embodiment of FIG. 2, the linkage means 30' comprises a biasing means and a connecting rod 120. The biasing means includes a cylindrically coiled inner spring or extension spring 122 having coils formed generally in planes perpendicular to the major axis of the cylinder. The inner spring 122 has first and second ends formed in ring-like fashion, the end rings being formed in planes in which the axis of the cylinder lies (that is, the planes of the end rings are generally perpendicular to the planes of the coils included in inner spring 122). Ring 124 at the upper end of the inner spring 122 is adapted to receive pin 102 therethrough when the ring 124 is inserted into the slot 98 of the plunger 92. Ring 126 at the lower end of the inner spring 122 is adapted to receive a pin 128. Lower ring 126 receives pin 128 when the lower ring 126 is inserted into a transverse slot 130 formed in a first end of end cap 132. End cap 132 has an aperture 134 through the diameter thereof which intersects the slot 130 in perpendicular fashion in a manner similar to the slot 98 in apertures 100 of the plunger 92.

End cap 132 has an annular shoulder 136 near its midsection so that an outer spring 138 can be confined between the shoulder 136 and the base member 68 of the backplate 64. Thus, the outer spring 138 is of greater diameter than the inner spring 122 fits in concentric fashion over the inner spring 122. The outer spring 138, according to one mode of the invention, preloads the inner expansion spring 122 by stretching spring 122 a desired distance so that spring 122 causes jaw 26 to exert a force of a desired magnitude on inserts engaged between jaws 24 and 26.

As further seen in FIG. 2, the lower end of the end cap 132 receives a threaded top 140 of the connecting rod 120. The connecting rod 120 extends between planes in which the side panels 54 are included downwardly toward the distal end 32 of the housing 20. The rod crooks outwardly to the side at point 142 as it extends downwardly, and then bends inwardly to have a portion 144 in horizontal orientation at the lowest extent of its travel. The lower end 144 of the rod is adapted to receive a lock member, such as C-clamp retainer 146.

The distal end 32 of the gripper arm housing 30 has, in the FIG. 2 embodiment shown, a first jaw member 24 which is formed integral with the housing 20 as a lower jaw member. A rectangular recess 160 is formed in a surface of the jaw 24 which is oriented to contact an article to be engaged by the gripper arm. The recess 160 is adapted to receive a piece of high coefficient of friction material, such as a piece of urethane 162.

The second jaw member 26 as shown in FIG. 2 comprises a block 170 insertable in a space defined by the separated lower ends of the side panels 54. The block 170 has a protruding curved member 172 extending therefrom, the underneath surface of which contacts articles to be engaged by the gripper arm. Block 170 also has two apertures 174 and 176 extending therethrough. The aperture 174 is adapted to receive a pivot pin 178 so that the second jaw member 26 can pivot about the pin 178. The second aperture 176 is adapted to receive the horizontally extending lower end portion 144 of the connecting rod 122.

The pivot pin 178 is received not only through aperture 174 in the jaw member 26, but also through aligned apertures 180 in the distal end of the side panels 54. Thus, when the second jaw member 26 is inserted in the space between the side panels 54 near the distal end 32 of the gripper arm housing 20, the apertures 174 and 180 are aligned so that the pivot pin 178 can freely fit therethrough. The pivot pin 178 is retained in position by a set screw 181 so that the pivot pin 178 rotates in bearing-like end caps 182.

The embodiment of FIGS. 1A and 1B differs slightly from the embodiment of FIG. 2, in the configuration of the particular linkage means utilized. While the embodiment of FIGS. 1A and 1B, like that of FIG. 2, has an inner spring 122, the inner spring 122 of the embodiment of FIGS. 1A and 1B is positioned in a cylindrical spacer or housing 202. As in the FIG. 2 embodiment, the upper ring 124 of the inner spring 122 is secured by plunger pin 102 to the solenoid plunger 92. The top of the cylindrical housing 202 abuts the lower end of the plunger 92.

The lower end of cylindrical housing 202 abuts a retaining ring 203. The retaining ring 203 is carried in an annular recess on a clevis-type end cap 204. The pin 128 extends radially through the end cap 204 in a manner understood from the description of the end cap 132 of FIG. 2. End cap 204 axially receives a pin 205 which has an upper exterior portion thereof threaded for engagement in an axial aperture of end cap 204. An upper end of a cable 206 is connected to the lower end of pin 205. Cable 206 extends from the pin 205 to the distal end 32 of the gripper jaw. At its lower end the cable 206 has a ball 208 fixedly attached thereto.

Located in the cylindrical housing 202 in the manner described above, the inner spring 122 of FIGS. 1A and 1B is held so that it is generally extended about 0.25 inches beyond its length at rest. The spring 122 is thus preloaded to have a desired spring force.

For the embodiment of FIGS. 1A and 1B and 11, the upper jaw member 26 comprises a block member 210 and a curved protrusion 212. The underside of the protrusion is used to contact articles engaged by the gripper arm. The block member 210 has a narrow slit 214 at the back thereof through which the lower portion of cable 206 extends. At the base of the slit 214 is an essentially square chamber 215. Chamber 215 houses ball 208. When cable 206 is pulled upwardly, the ball 208 thereon, having a greater diameter than the width of the slit 214, bears against the top interior surface of the chamber 215, causing the upper jaw member 26 to pivot so that the upper jaw member 26 approaches the lower jaw member 24 so that the jaw essentially closes.

The block member 210 of second jaw 26 also has three apertures 216, 218, and 220 extending therethrough. The central aperture (aperture 218) accommodates a pivot pin 222 about which the jaw member 26 pivots.

The embodiment of FIGS. 1A and 1B and 11 further comprises means for biasing the jaw members in an open position. The biasing means includes torsion spring 230 (seen in FIGS. 12A and 12B). An intermediate portion of the torsion spring 230 has a helical shape which is concentric with and fits over an exposed end of pivot pin 222, the end of pin 222 protruding beyond a side panel (the left side panel as seen in FIG. 12B) of the gripper arm. At its exposed, protruding end the pivot pin 222 has a head 232 formed thereon. A disc 234 is secured on the pivot pin 222 just inside its head 232. The helical portion of the torsion spring extends between the disc 234 and the left side panel of the gripper arm. At one of its ends the torsion spring 230 departs from its helical configuration and assumes a linear shape as it extends upwardly to a retaining pin 236 against a side of which it bears (see FIG. 12B). At its other end the torsion spring 230 extends through a square notch 238 formed on the circumference of the disc 234. The portion of the torsion spring 230 that extends through the disc 234 bears against a corner 240 of the notch 238. Spring 230 bears against corner 240 to exert a biasing force on the disc 234 and the pivot pin 222 whereby the upper jaw member 26 is normally held open in the absence of application of tension to the cable 206. When cable 206 and ball 208 thereon are urged upwardly, however, ball 208 bears against the upper interior surface of the chamber 215 and exerts a force on block 210 which overcomes the biasing force of the torsion spring 230 so that block 210 pivots about pin 222, thus causing jaw 26 to close.

GRIPPER ARM-ASSOCIATED OPTO/ELECTRICAL STRUCTURE

Figure 3:
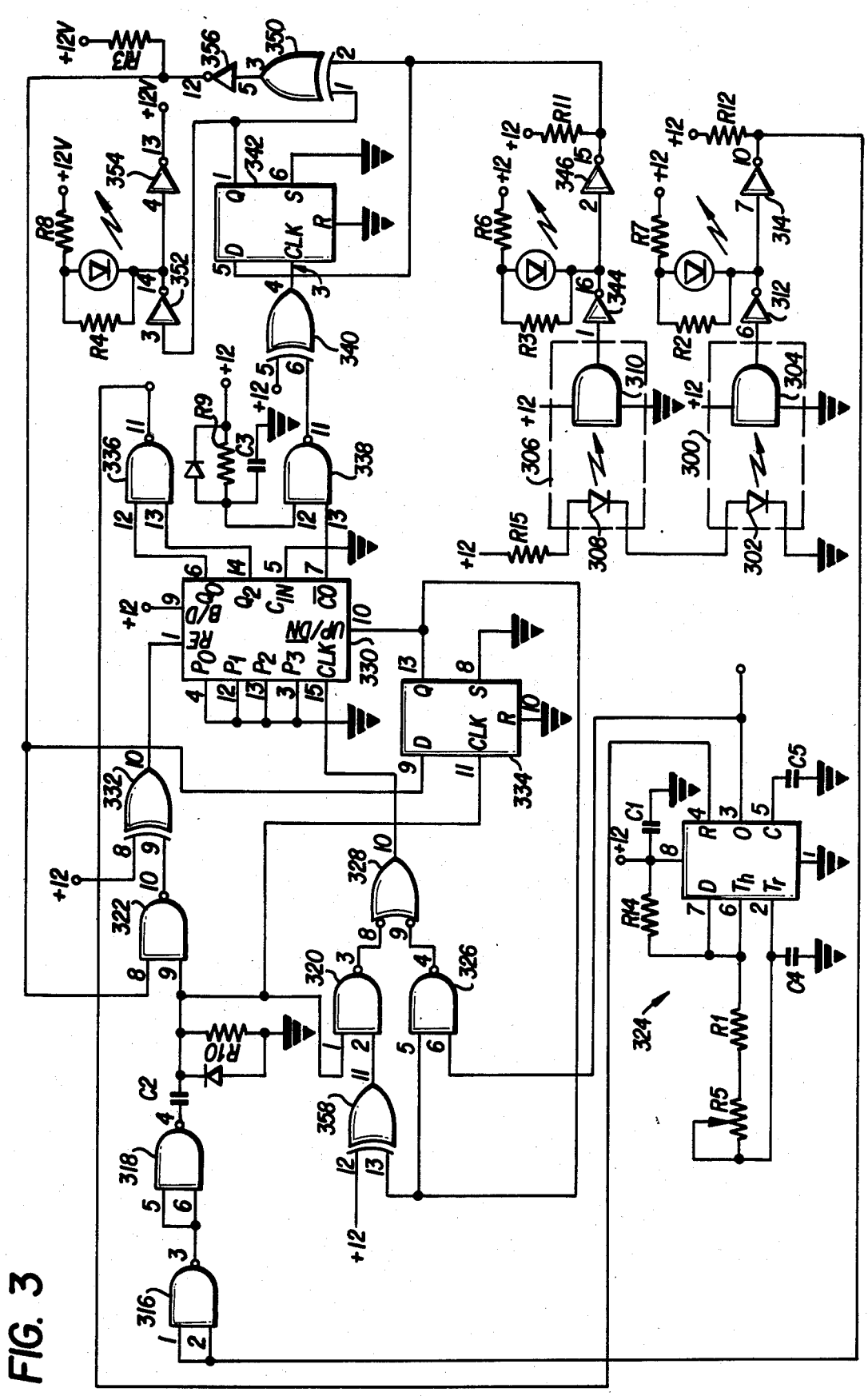
FIG. 3 is a circuit diagram showing actuator control means according to an embodiment of the invention.

FIG. 3 shows circuitry utilized in connection with the gripper jaw actuating control means according to an embodiment of the invention. An encoder disc 260 and an actuator timing disc 262 are mounted to rotate on a main drive shaft 263 of a machine, such as an insertion machine as illustrated in FIG. 1, in connection with which the gripper arm 16 of the invention operates. The main drive shaft rotates once per machine cycle and has various timing and drive means rigidly coupled thereto for power transmission, such as the aforementioned oscillating drive means 17, for example. The encoder disc 260 is a 64-tooth disc. The actuator timing disc 262 has its circumference configured to allow the passage of light (in a direction perpendicular to the plane of the disc) about a disc central angle 266 corresponding to portions of a machine cycle during which the actuation means of the gripper arm is to be actuated so that the second jaw is either in contacting relation with the first jaw or has an article gripped between the first jaw and the second jaw.

FIG. 3 shows an encoder disc sensor 300 including the above-mentioned encoder disc 260 positioned to cause passage of light from an LED 302 to be periodically incident on circumferential teeth of the encoder disc. If the light from LED 302 impinges on a tooth of the disc, then the light is not transmitted to receiver 304. If a circumferential space between the teeth on the encoder disc is aligned with a beam of light from LED 302, then the receiver 304 detects the light. An actuator timing disc sensor 306 also includes the above-mentioned actuator timing disc 262 with an LED 308 and a photoreceiver 310 similarly arranged about the actuator timing disc.

The opto-interrupt receiver 304 is connected to two inverting drivers 312,314 in series with one another. The output of the inverting driver 314 is connected to both input terminals of a NAND 316, the output of which is connected to both input terminals of a second NAND 318. The output of NAND 318 is connected to two other NANDs (NANDs 320 and 322).

The circuit of FIG. 3 also includes a clock or timer 324 having its clock output pin (pin 3) connected to a first input of a NAND 326. The NANDs 320 and 326 have their output terminals connected to respective input terminals of a false-actuated OR gate 328. The output terminal of OR gate 328 is connected to a clock input pin (pin 15) of a delay determination means, such as a presettable up/down binary counter 330.

Up/down counter 330 has its reset input pin connected to an output terminal and an EOR gate 332. One input of the EOR 332 is connected to +12 volts; the other input terminal is connected to the output of NAND 322.

The up/down direction pin (pin 10) of the counter 330 is connected to the Q output of a "D" flip-flop 334. The set and reset input pins of the flip-flop 334 are grounded. The "D" or data input pin of the flip-flop 334 is connected to a "compare" signal in the manner hereinafter described. The clock input pin (pin 11) of the flip-flop 334 is connected to the output of NAND 318.

The data input pins (pins 4, 12, 13, and 3) and pin 5 of counter 330 are grounded. Output pins 6 and 14 of the counter 330 are connected to respective input terminals of a NAND 336. The output terminal of NAND 336 is connected to the reset terminal (pin 4) of the timer 324.

The carry-out terminal (pin 7) of counter 330 is connected to a first input terminal of a NAND 338. The second input terminal of NAND 338 is connected to an appropriate voltage for setting initial conditions for machine start-up. The output of NAND 338 is connected to a first input terminal of an EOR 340, the other input terminal of the EOR 340 being connected to a +12 volts. The output of the EOR 340 is connected to a clock input pin (pin 3) of a "D" flip-flop 342.

Flip-flop 342 has its reset and set terminals (pins 4 and 6, respectively) connected to ground. The "D" or data terminal is connected to the output of inverting drivers 344 and 346 which are connected in series between the receiver 310 and the flip-flop 342. The Q output terminal (pin 1) of the flip-flop 342 is connected both to the first input terminal of an EOR gate 350 and to two inverting drivers 352 and 354 in series. The other input terminal of the EOR 350 is connected through the inverting drivers 344 and 346 to the receiver 310 of the actuator timing disc 306.

The output terminal of the EOR 350 is connected to an inverting driver 356. The output terminal of the inverting driver is in turn connected both to the data input pin (pin 9) of flip-flop 334 and to the second input terminal of NAND 322.

The Q output terminal of flip-flop 334 is also connected both to the second input terminal of NAND 326 and to a first input terminal of an EOR gate 358. The other input terminal of the EOR gate 358 is connected to +12 volts. The output terminal of the EOR gate 358 is connected to the second input terminal of NAND 320.

In the illustrated embodiment, NANDs 316, 318, 320, 322, 326, 336, 338, and false-activated OR 328 are included in a single integrated circuit chip such as a QUAD-2 Input NAND Schmitt Trigger. Counter 330 is a presettable up/down binary counter. EOR gates 332, 340, 350, and 358 are included in a quad Exclusive OR gate. Flip-flops 334 and 342 are included in a Dual "D" Flip-Flop Chip. Clock 324 is a linear timer. Inverter drivers 312, 314, 344, 346, 352, 354, and 356 are included in a 7-channel PMOS Input Driver.

For the embodiment of FIG. 3, by way of example, resistance values are given to the resistors and capacitance values are given to the capacitances as shown on the following chart:

RESISTANCES

R1=R2=R3=R4=1 K
R5=5 K (variable)
R6=R7=R8=1.2 K
R9=R10=100 K
R11=R12=R13=R14=10 K
R15=470 Ohm

CAPACITANCES

C1=0.1 F
C2=0.001 F
C3=1.0 F
C4=0.47 F
C5=0.01 F

MISTAKE DETECTOR

Figure 8:
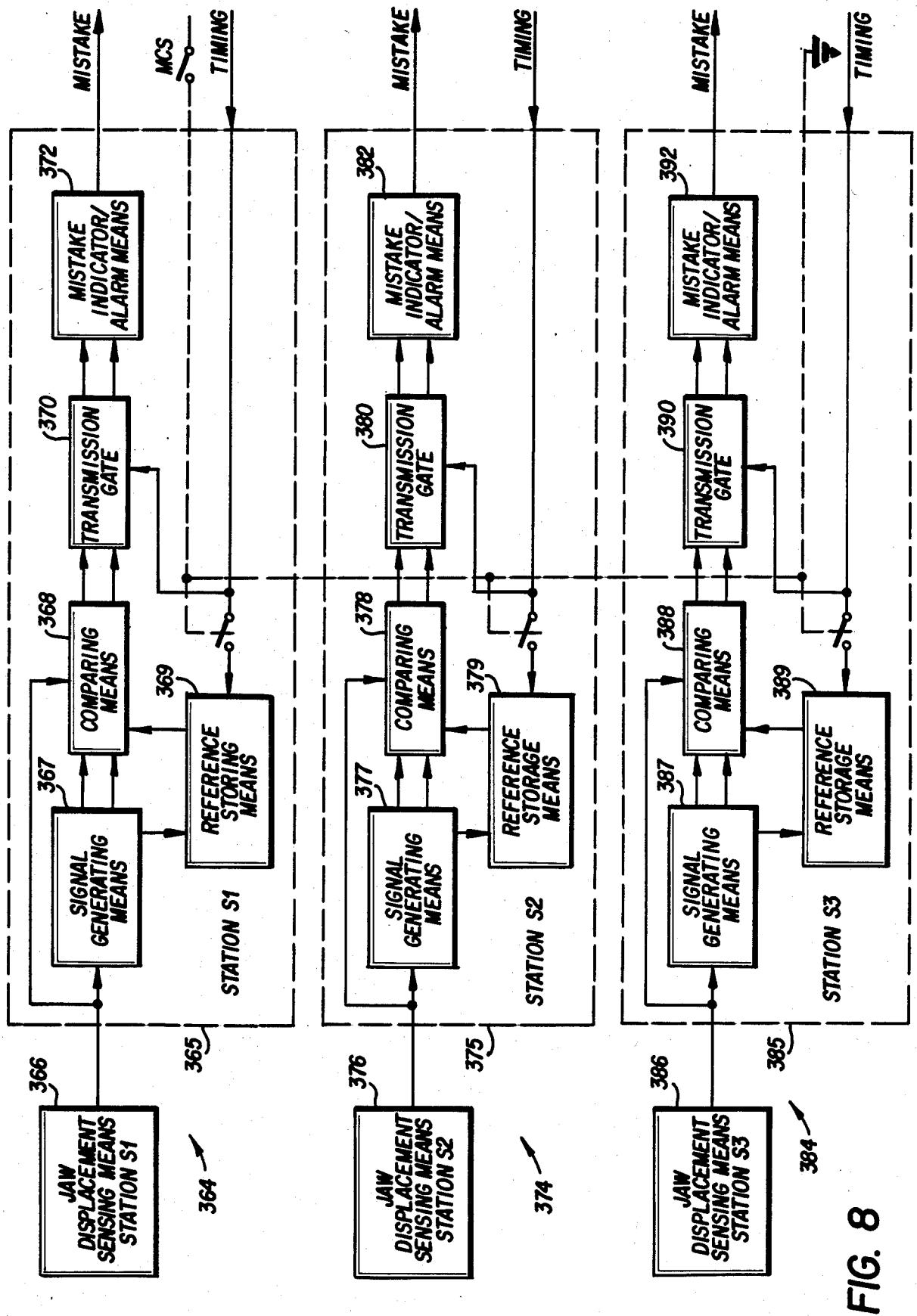
FIG. 8 is an illustrative block diagram of a mistake detector for a plurality of gripper arms according to an embodiment of the invention.

As mentioned above, insertion machine 10 includes an improved double/miss mistake detector. This double/miss detector indicates when one of gripper arms $16_1$, $16_2$, or $16_3$ grip too few or too many inserts. More particularly, as shown in FIG. 8, there is provided a double/miss detector for each of the gripper arms, i.e., a detector 364, 374, and 384 for indicating when gripper arms $16_1$, $16_2$, and $16_3$, respectively, grip the wrong number of inserts. Since detectors 364, 374, and 384 are substantially similar, only detector 364 will be described in detail and it will be understood that detectors 374 and 384 will operate in a similar manner under similar conditions.

Detector 364 serves to detect when gripper jaw $16_1$ has gripped too few or too many inserts. To this end, there are provided in detector 364, a jaw displacement sensing means 366 and a mistake indicating circuit 365. Jaw displacement sensing means 366 is mounted on the gripper jaws of arm $16_1$ as hereinafter described and serves to generate an electrical signal proportional to the relative displacement between the gripper jaws. When a proper number of inserts are known to be gripped between the gripper jaws, a switch is closed and a set pulse is provided to mistake indicating circuit 365 which then serves to convert the electrical signal proportional to jaw displacement to a stored reference signal. This stored reference signal is used by indicating circuit 365 during a preselected time of a machine cycle to determine if the electrical signal generated by sensing device 366 is within predetermined limits.

It will be appreciated that the jaws of the gripper arm are forced open prior to grabbing the insert and the jaws are forced open in order to release the insert. Since sensing means 366 continuously generates an electrical signal proportional to jaw displacement, it is desirable to indicate a mistake condition only during the portion of the machine cycle when the gripper jaws are holding the insert, i.e., when the inserts are being pulled from the stack. In the present embodiment, a timing signal is applied to indicating circuit 365 shortly after the gripper arm has pulled the insert from the stack and circuit 365 indicates a mistake condition only during this enabling signal. Thus, although sensing means 366 continuously generates an electrical signal proportional to jaw displacement, indicating circuit 365 indicates a mistake condition only when the jaws are displaced by the inserts.

To the end that mistake indicating circuit 365 may store a reference signal and indicate when a proper number of documents is not gripped by the gripper jaws, there are provided in indicator 365, a signal generating means 367; a comparing means 368; a storing means 369; a transmission gate 370; and, a mistake indicator/alarm means 372. Signal generating means 367 is connected to sensing means 366 and generates three electrical signals which are proportional to the signal generated by sensing means 366. The first signal generated is proportional to the signal generated by sensing means 366 and is applied to an input of storing means 369. The second signal generated is a fixed percentage greater than the first signal and corresponds to the lower limit of acceptable jaw displacement. The third signal generated is a fixed percentage less than the first signal and corresponds to the upper limit of acceptable jaw displacement. Storing means 369 stores the first electrical signal from generating means 367 during the detector set-up or calibration time and thereafter applies that stored reference to comparing means 368. Comparing means 368 compares the second and third signals from generating means 367 with the stored reference signal from storing means 369 and generates a first electrical signal when the results of the comparison indicate that either too few inserts have been grabbed by the gripper jaw and a second electrical signal when the results of the comparison indicate that either too many inserts have been grabbed by the gripper jaw. The results of comparing means 368 are applied to the input of a transmission gate 370 which provides a mistake indication only after the gripper jaw pulls the insert from the stack.

MISTAKE DETECTOR SENSOR STRUCTURE

FIGS. 6A and 6B show a sensor means 400 which, as shown in FIGS. 1A and 1B, is mounted near the distal end 32 of the gripper arm 16. The sensor means 400 is included in the jaw displacement sensing means such as sensing means 366 of FIG. 8. The sensor means 400 includes a housing block 402 having a rectangular channel 404 formed on its front surface. The rectangular channel 404 has only one edge 406 thereof extending to an edge of the housing block 402. Two fasteners 408 having their shafts flush with the channel 404 extend through the housing block 402 to secure the sensor means 400 to the gripper arm in the location depicted in FIGS. 1A and 1B.

The sensor means 400 further includes a cover plate 410 which as seen in the rear view of FIG. 6A has rectangular dimensions comparable to the front rectangular dimensions of the housing block 402. The cover plate 410 is secured onto the housing block 402 by an epoxy adhesive material. A sensor element 412 is accommodated in the rectangular cavity defined by the housing block 402 and the cover plate 410. Sensor element 412 serves to sense the flux density of a generated field and generates an output signal proportional thereto. In one embodiment the sensor element 412 comprises a current-carrying electrical conductor across which a voltage is generated when the conductor is in a magnetic field, the magnitude of the generated voltage being proportional to the magnetic field flux intensity. An example of this embodiment of sensor element 412 is a Hall Effect sensor element. A cable 413 comprising three leads 414, 416, and 418 extends from the sensor element 412 to the circuit of FIG. 8A as hereinafter described.

FIGS. 7A and 7B show a magnetic means 420 which is included in the jaw displacement sensing means such as means 366 and which cooperates with the sensor means 400. The magnetic means 420 includes two rare earth magnets 422 and 424, each being essentially disc-shaped. Each disc-shaped magnet 422,424 is mounted in corresponding circular apertures formed in a disc-shaped holder 426 having a diameter at least greater than the sum of the diameters of the magnets.

As seen in FIG. 7A, magnet 422 has its North pole exposed while magnet 424 has its South pole exposed. The circumferences of the two disc-shaped magnets come close to touching on a line 428 which connects their centers.

The magnet holder 426 is further mounted in a mounting bracket 430. Mounting bracket 430 is a thin sheet of a resilient metal such as Spring Temper Brass. Bracket 430 is bent along a line 432 which separates an upper bracket portion from a lower bracket portion. In its natural state (i.e., not installed in the gripper arm so that no external mechanical forces are acting on the upper portion of the bracket 430), the upper bracket portion bends away from the lower bracket portion at an angle alpha which is approximately 15 degrees. The upper bracket portion has the magnet holder 426 mounted therein. The lower bracket portion has three apertures extending therethrough. A central aperture 434 is sized to accommodate the pin 222 which functions as the pivot point about which the second jaw member pivots with respect to the first jaw member. The central aperture 434 is positioned so that an imaginary line 436 extending through the diameter of aperture 434 and constructed perpendicular to line 428 intersects line 428 midway between the centers of magnet 422 and 424. The point of intersection of the imaginary line 436 and the line 428 bisected thereby is taken as the center of the magnetic field and labeled as point K in the drawings. Apertures 438 on either side of central aperture 434 are adapted to receive fasteners 440 which, as seen in FIG. 1A, secure the magnet means 420 and particularly mounting bracket 430 of the imaginary line 436 and the line 428 bisected thereby is taken as the center of the magnetic field and labeled as point K in the drawings. Apertures 438 on either side of central aperture 434 are adapted to receive fasteners 440 which, as seen in FIG. 1A, secure the magnet means 420 and particularly mounting bracket 430 thereof to the second jaw means 26.

As shown in FIG. 1B, the magnetic means 420 is sandwiched between a gripper arm side panel on its one side and the sensor means 400 on the other gripper arm side panel on its other side. In order to be held in the position shown in FIG. 1B the resilient bracket 430 must be deflected to an essentially planar configuration rather than the configuration of FIG. 7B which shows a bending of the upper bracket portion about an angle alpha from the lower bracket portion. When in the assembled configuration of FIG. 1B, it is to be understood that the spring-like resilient biasing properties of the bracket 430 urge the essentially planar face of the disc-shaped magnet holder 426 against the essentially planar cover plate 410 of the sensor 400. As seen hereinafter with respect to FIG. 1B, movement of the second jaw member 26 about pivot point 222 causes the magnetic means 420 to slide across the sensor means 400, thereby changing the magnetic field flux detected by the sensor element 412.

MISTAKE DETECTOR CIRCUITRY

Figure 8A:
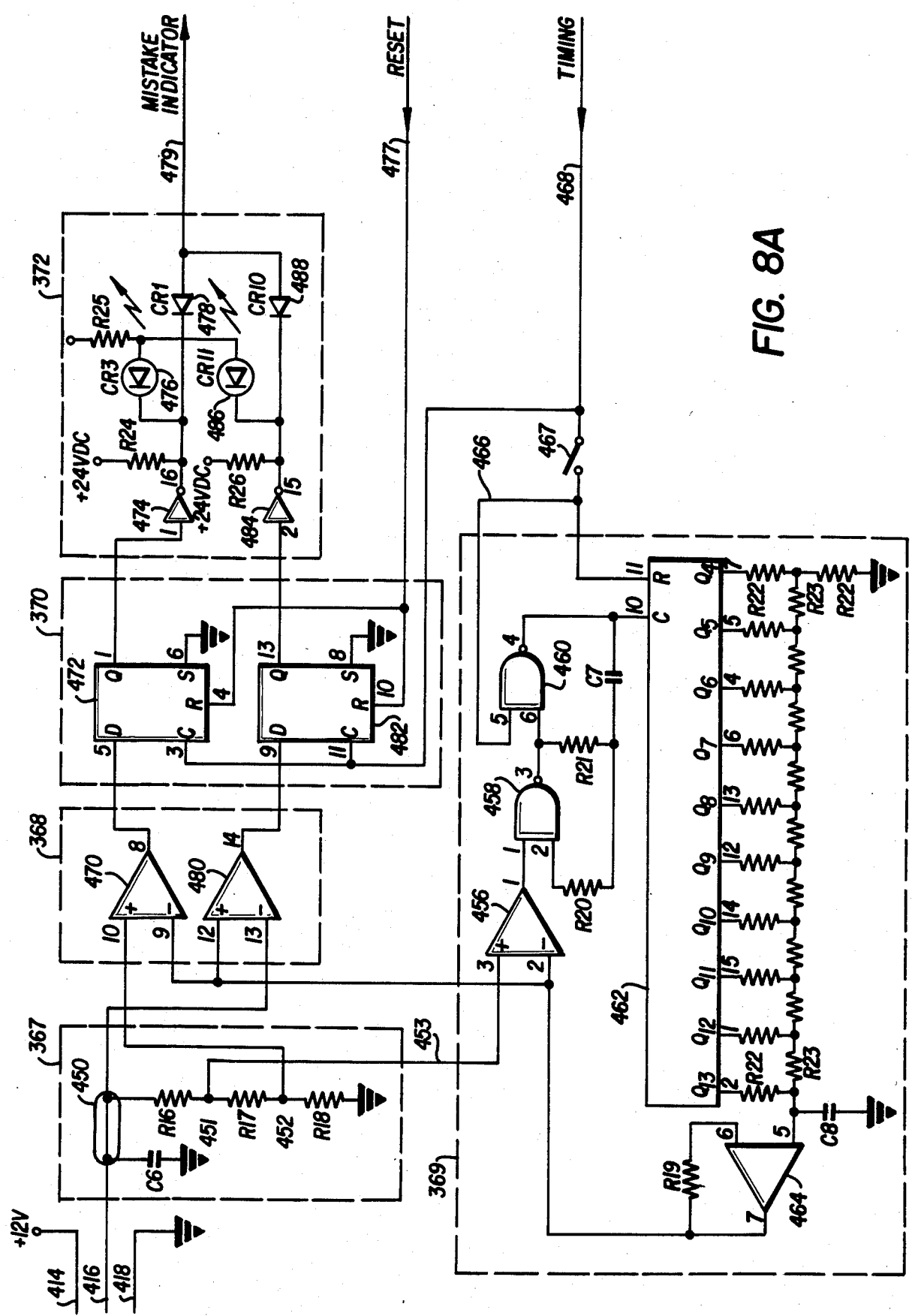
FIG. 8A is a schematic diagram depicting electrical circuitry included in the mistake detector of FIG. 8.
Figure 13:
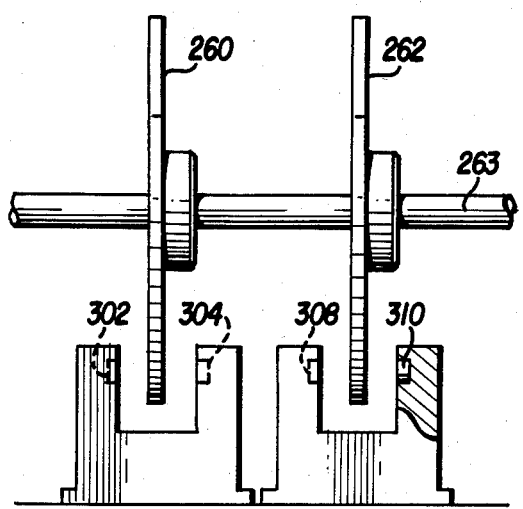
FIG. 13 is a side sectional view showing first sensor means and second sensor means mounted in relationship to a main drive shaft means.
Figure 14:
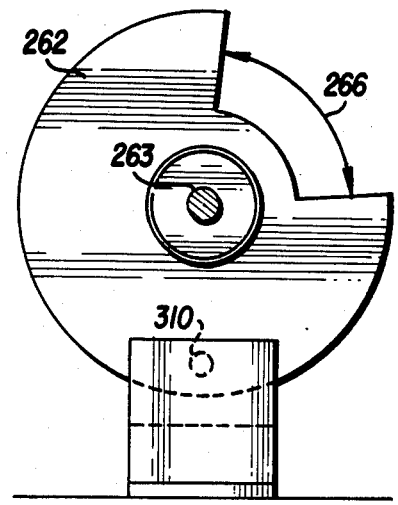
FIG. 14 is an end view of an actuator timing disc included in a second sensor means; and, FIG. 15 is a graph showing solenoid force requirements and spring force requirements as functions both of solenoid and upper jaw member positions according to an embodiment of the invention.

As mentioned above, cable 413 extending from the sensor means 400 includes the leads 414, 416, and 418 which are connected to the circuit of FIG. 8A. The circuit of FIG. 8A is not located on the gripper arm itself, but on a circuit board remote from the gripper arm.

As shown in FIG. 8A, leads 414 and 418 are connected to +12 volts and ground, respectively. Lead 416 is connected to a node 450 of the signal generating means 367. Signal generating means 367 includes a voltage division network which comprises resistors R16, R17 and R18. In the voltage division network a node 451 occurs between the connection of resistors R16 and R17 and a node 452 occurs between the connection of resistors R17 and R18. Node 450 is connected by a capacitor C6 to ground.

The low side of resistor R16 (node 451) is connected by a lead 453 to storing means 369 illustrated as a sample and hold circuit, and particularly to a non-inverting input terminal of a linear operational amplifier 456 included therein. The sample and hold circuit further comprises NAND gates 58 and 460; a 14-stage binary counter 462; and, an operational amplifier 464. The inverting input terminal of the OP AM 456 is connected both to the output terminal of the OP AMP 464 and through a resistor R19 to the inverting input terminal of the OP AMP 464. The output terminal of the OP AMP 456 is connected to a first input terminal of the NAND 458. The second input terminal of the NAND 458 is connected by resistor R20 and capacitor C7 in series both to the output terminal of NAND 460 and to the clock input pin of the counter 462. The second input terminal of the NAND 458 is also connected to both the output terminal of NAND 458 and to a first input terminal of NAND 460 through resistors R20 and R21. A second input terminal of NAND 460 is connected through a lead 466 to a lead 468 and a selectively closable calibration switch 467. Lead 468, which carries a clocking signal, is connected to a reset pin of the counter 462 through the calibration switch 467.

Output pins 1, 2, 4–7, and 12–15 of counter 462 are each connected by one of the resistors R22 to a voltage division network. The voltage division network comprises nine resistors R23 arranged in series, the low side of each resistor connected (through a resistor R22) to a corresponding output pin of the counter 462 and the high side connected (through a resistor R22) to a neighboring output pin of the counter 462. Output pin 2 of the counter 462 is connected through its associated resistor R22 to the non-inverting input terminal of OP AMP 464 and through the resistor R22 and capacitor C8 to ground.

The circuit of FIG. 8A also illustrates in more detail the comparing means 368; the transmission gate 370; and the mistake indicator/alarm means 372. In this respect, the comparison means 368 comprises both "double" comparison means (such as operational amplifier 470) and "miss" comparison means (such as operational amplifier 480). Similarly, the transmission gate 370 comprises a "double" mistake gate (including a multivibrator such as "D"-type flip flop 472) and a "miss" mistake gate (including a similar multivibrator 482). The indicator alarm means 372 includes inverting drivers 474 and 484 and respective LEDs such as "double" LED 476 and "miss" LED 486.

With respect to circuit elements used to detect a "double", the non-inverting input terminal of the OP AMP 470 is connected to the low side of resistor R17 (node 452) while the inverting input terminal of OP AMP 470 is connected to the calibrated reference signal occurring at the output terminal of the OP AMP 464. The output terminal of the OP AMP 470 is connected to the data input pin of the flip-flop 472. The set terminal of the flip-flop 472 is grounded, but its Q terminal is connected to the input terminal of the inverting driver 474. The clock pin of flip-flop 472 is ultimately connected to a lead 468 which carries a timing pulse indicative of the point in time of a machine cycle when the flip-flop 472 is to transmit the comparison results to the indicator alarm means 372 (i.e., the point in time in which the separation of the gripper jaw members 24 and 26 is to be detected). The reset pin of the flip-flop 472 is connected to a lead 477 which selectively carries a reset pulse.

The output terminal of the driver 474 is connected (1) through a resistor R24 to +24 volts D.C.; (2) to the cathode of LED 476 and through resistor R25 to +24 volts D.C.; and, (3) to the cathode of a diode 478, the anode of which is connected to a lead 479 which carries a signal indicative of a detected mistake to unillustrated portions of the system which have need to know of the mistake.

With the exception of the input terminals of the OP AMP 483, the elements 480, 482, 484, 486, and 488 used to detect a "miss" are connected in analogous manner with the elements 470, 472, 474, 476, and 478 as described above. However, the non-inverting input terminal of the OP AMP 480 is connected to the calibrated reference signal occurring at the output terminal of the OP AMP 464 while the inverting input terminal of OP AMP 480 is connected to the node 450 (the high side of resistor R16).

For the embodiment of the electrical circuitry associated with the Hall Effect sensor 400 as shown in FIG. 8A, operational amplifiers 456, 464, 470, and 480 are included on a quad OP AMP chip; NAND gates and 460 are included on a quad 2-input NAND Schmitt trigger chip; and, flip-flops 472 and 482 are included on a Dual "D" flip-flop chip. The resistors and capacitors shown in the embodiment of FIG. 8A have the values shown on the following charts:

Resistors

R16=100 ohm
R17=100 ohm
R18=4.7 K
R19=100 K
R20=100 K
R21=10 K
R22=200 K
R23=100 K
R24=10 K
R25=1.8 K
R26=10 K Capacitors C6=1 micro F
C7=0.003 micro F
C8=500 pico F

OPERATION

The operation of the gripper arm and the mistake detector are hereinafter described. The first general phase of operation described hereinafter is the opening of the gripper jaws such as takes place when an insert is released for dropping onto the raceway 18. The second general phase of operation described hereinafter is the closing of the gripper jaws to engage another insert between the gripper jaws so as to pull the insert from its stack at the insert station. The third general phase of operation described hereinafter is the operation of the mistake detector which determines whether the proper number of inserts are engaged between the closed gripper jaws.

For the most part the ensuing discussion of the operation of the gripper arm and the mistake detector assumes that the normal operations of the insertion machine are currently on-going and that initialization or set-up of the insertion machine has already taken place. That is, the operation of the insertion machine is described herein as being for the most part in the middle of a job. Where appropriate, however, operating steps or results that have impact or pertain to machine set-up or calibration are also described. In this respect, from FIG. 4 and portions of the ensuing discussion it is understood that the operation of a slow jog mode such as used in machine set up is, except for matters of timing, similar to the on-going operation. Also, following the description of the operation of the mistake detector the calibration operation of the mistake detector is also described.

GRIPPER JAW OPENING OPERATION

At an appropriate point in the machine cycle when the gripper jaws 24 and 26 are engaging an insert, light from the LED 302 of opto-interrupter of encoder disc sensor 300 radiates through spaces between the teeth on the encoder disc so as to be incident upon receiver 304, causing the receiver 304 to output a true signal to the inverting driver 312. Inverting driver 312 inverts the true signal to a false signal for application to inverting driver 314. Inverting driver 314 in turn inverts the false signal to a true signal. When the teeth of the encoder disc interrupt the light between the LED 302 and the receiver 304, a false signal appears at the output of the inverting driver 314. Thus, as the encoder disc rotates, a series of pulses is produced. In the series of encoder pulses generated by the 64-tooth disc, the machine main shaft rotates 5.625° of the machine cycle (5.625 DMC) between the leading edges of consecutive true signals. The graphs of encoder pulse trains generated in this manner appear in FIGS. 4 and 5. The encoder pulse train is applied to NANDs 316 and 318 of the circuit shown in FIG. 3.

During operation the clock 324 is generating clock pulses at a frequency determined by the manner in which the pins of the clock 324 are connected. When connected in the manner shown in FIG. 3 and described herein, the clock 324 generates pulses at a 178 Hz rate. Trains of pulses from the clock 324 are shown in FIGS. 4 and 5. Note that in FIG. 4 there are more clock pulses relative to the number of encoding pulses than shown in FIG. 5. In FIG. 4, the machine is operating at 4,500 machines cycles (MC) per hour whereas in FIG. 5 the machine is approaching 10,000 MC.

The clock pulses from clock 324 are applied to the first input terminal of NAND 326. Whenever the second input terminal of the NAND 326 is also true, a false signal is applied from the NAND 326 to the false-actuated OR gate 328. When the other input terminal of the false-actuated OR 328 is true, then pulses from the OR 328 are applied to the clock input pin of the presettable up/down counter 330.

Counter 330 counts up when pin 10 (the directional pin) is true and counts down when the directional pin is false. The clock pulses of carry out pin 7 of the counter 330 are seen in FIGS. 4 and 5. In relation to the clock pulses from clock 324, the leading edge of the output pulses from the counter 330 occur substantially at the same time as the leading edge of clock pulses from the clock 324.

Reset pin 1 of the counter 330 is ultimately connected to the encoder disc sensor 300, so that the reset pin of counter 330 receives a train of pulses the frequency of which is related to the number of machine cycles occuring per hour. The leading edge of a pulse in this encoder train from the EOR 332 causes the counter to be reset, thereby terminating the output pulse from the counter 330. Thus, as seen in FIG. 4, when the machine is operating relatively slowly at a rate of 4,500 MC per hour, the counter 330 can count up a greater number of clock pulses before it is reset by the leading edge of an encoded pulse from the EOR 332. In the graph of FIG. 5 on the other hand, the counter 330 has sufficient time only to count up one clock pulse before being reset.

The above description of the operation assumes that the actuator timing disc mounted on the machine drive shaft is in a position to permit the passage of light from the LED 308 to the receiver 310. Under such circumstances the actuator is activated, and hence the linkage 30 causes the second jaw member 26 to be urged toward a contacting relationship with the first jaw member 24. The actuator timing disc has patterns on its circumference to obstruct the position of light from the LED 308 to the receiver 310 at points in the machine cycle in which it is desired for the second jaw 26 to open with respect to the jaw 24 as a result of the actuator activation. When this occurs, the absence of light at the receiver 310 causes output from the inverting driver 346 to go false. This false signal is applied to the second input of the EOR 350. The first input terminals of the EOR 350 still receives a true signal from the flip-flop 342 since no clock pulse has been applied to the flip-flop 342 to cause the flip-flop 342 to be effected by the false signal appearing at the "D" pin (pin 5) of the flip-flop 342. The true signal from the Q output of the flip-flop 342 keeps the solenoid drive at a true level meaning that the solenoid 28 is activated and that the jaws 24,26 remain together.

Since the EOR 350 now receives a true signal from the flip-flop 342 and a false signal from the inverting driver 346, the output of the EOR 350 goes true. This true signal is inverted by the inverting driver 356 to be false. The false signal from the inverter 356 is seen in FIGS. 4 and 5 as dropping to a false level in the portion of the graph labeled "Compare Output".

The false signal from the inverting driver 356 (i.e. the "compare output" signal) is used in two ways. First, it is used to reverse the direction of the counting of the counter 330. In this regard, the false signal from inverter 356 is applied to the data input pin (pin 9) of the flip-flop 334 which causes the Q output pin to go false when the next encoder pulse is received at the clock input pin of the flip-flop 334. The false output of flip-flop 334 at the Q terminal causes the counter 330 to change direction (that is, to count down). Second, the false signal from the inverting driver 356 is used to keep the EOR 332 from resetting the counter 334 while the counter 334 is counting down.

As mentioned above, the false signal from the inverting driver 356 causes the Q output terminal of the flip-flop 334 to go false. This false signal is also applied to the NAND 326 and the EOR 358. A false signal applied to NAND 326 keeps the false-actuated EOR 328 from passing clock pulses to the counter 330 while the counter is counting down. A false applied to the EOR 358 allows the EOR 328 to pass encoder pulses to the counter 330 rather than clock pulses.

Thus, when the direction of the counter 330 is changed so that the counter 330 counts down, the counter 330 no longer counts clock pulses, but encoder pulses. When the number of encoder pulses counted down equals the number of clock pulses counted up, the carry-out pin (pin 7) of the counter 330 causes a signal to be applied to the clock terminal of the flip-flop 342 so the false signal appearing at the "D" pin is clocked through the flip-flop 342 and a false signal appears at the Q output terminal. A false signal at the Q output terminal of the flip-flop 342 deactivates the jaw actuator 28. Deactivation of the jaw actuator means that the plunger 92 is free to fall downwardly, as does the linkage 30. Downward action of the linkage 30 causes the second jaw member 26 to pivot about pivot pin 178 in a direction away from the first jaw member 24. The false signal at the Q output terminal of flip-flop 342 also, when coupled with the false signal from the inverting driver 346, causes the compare signal (the output of the inverting driver 356) to again go true, thus enabling the clock 330 to start counting in an up direction and enabling the EOR 328 to pass clock pulses to the counter 330 rather than encoder pulses.

From the foregoing it is seen that an advantage of the invention is making the time at which the jaw actuator is selectively activated and deactivated dependent upon the speed in conjunction with which the gripper arm operates. As shown in FIG. 4, when the machine is operating at 4,500 MC per hour, a delay of 15 DMC occurs between an indication from the actuator timing disc that the actuator is to be deactivated and the actual deactivation. In FIG. 5 where the machine operates at 10,000 MC per hour, on the other hand, the delay is 7 DMC. Less delay for deactivation of the actuator is required at higher machine operating speeds than lower machine operating speeds for the gripper arm to carry out operations that result in precise placement of an article engaged and released by a gripper arm. By making the time of the deactivation of the jaw actuator dependent upon the speed of the machine, an operator can set up a machine in a slow jog mode for a gripper arm to deposit an article at a precise location on transport means with confidence that when the machine is operating at a higher speed essentially the same precise placement of the article will occur.

GRIPPER ARM JAW CLOSING OPERATION

It has been described above how the second jaw member 26 opens with respect to jaw member 24 after the jaws 24,26 had previously been in contacting relation. The preceding discussion provides the man skilled in the art with ample understanding of how, once the jaw 26 has been opened relative to the jaw 24, the jaw 26 again closes to engage whatever article may be between the jaws 24 and 26. Hence, the following discussion of the closing of jaw 26 does not include features analogous to those already described, but rather the relationship of solenoid force requirements and spring force requirements involved in the closing of jaw 26.

When the actuator timing disc is again in a position to permit light to pass from LED 308 to receiver 310, the input to the solenoid 28 goes true to activate the solenoid 28. The activation of solenoid 28 creates a force on cable 206 to move cable 206 in an upwards direction. The amount of force created by the solenoid depends upon such factors as the force curve for the particular solenoid used and its duty cycle. The force curve for the pull-type solenoid described herein is shown by line 500 in FIG. 15 for a solenoid operating for a duty cycle f=¼ (f="on" time divided by the sum of "on" and "off" times). For the solenoid shown, a voltage of 54 volts DC is applied upon activation for 100 milliseconds. When the solenoid is seated the voltage is reduced to 27 volts DC with a resultant holding force of 9 pounds.

Figure 15:
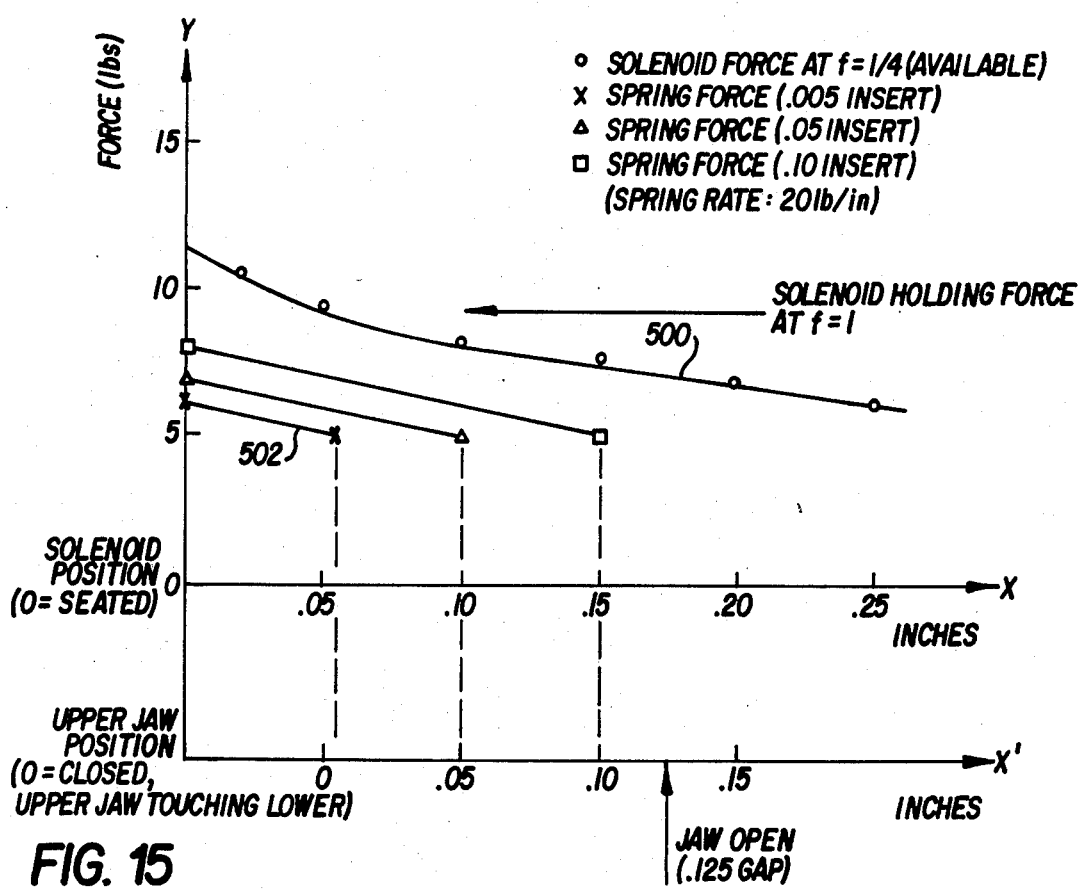

The graph of FIG. 15 shows solenoid force and spring force plotted as functions of both the solenoid position (upper X axis) and the position of the upper jaws (lower X' axis). The X axis of FIG. 15 refers to the extension of the plunger 92 of the solenoid 28, the zero position of the X axis being the seated position of plunger 92. The X' axis of FIG. 15 refers to the distance separating the lower jaw member 24 and the upper jaw member 26. The zero of axis X' is offset by about 0.05 inch with respect to the zero of axis X. This offset occurs because after the upper jaw 26 contacts the lower jaw 24 the solenoid plunger 92 travels another 0.50 inch before seating. Though offset, the scales for the axes X and X' are the same since the distance from pivot point 222 to the point where cable 206 attached to pin 205 is substantially equal to the distance from the pivot point 222 to the position of jaw 26 which selectively contacts jaw 24.

Accordingly, and in view of the relationship described above, for jaw 26 to contact the jaw 24 the plunger 92 must be retracted 0.125 inches. When an insert is to be engaged between jaws 24 and 26, the plunger need be retracted 0.125 inches less the thickness of the insert. Thus, for an insert 0.005 inch thick as shown by line 502 in the graph of FIG. 15, the plunger 92 must be retracted 0.125 inch−0.005 inch=0.120 inch. Further, if it be desired that the insert be held by a holding force of 6 pounds, for example, the plunger 92 must be retracted a further amount which will extend the expansion spring 122 sufficiently so that the spring 122 will cause the insert to see a 6 pound holding force.

Assuming, for example, that the spring 122 has a 20 pound per inch spring rate, if the spring 122 were not preloaded the spring 122 would have to be extended 0.3 inches to achieve the 6 pound holding force. The distance of retraction of the plunger 92 to both move the 0.120 inch to displace jaw 26 and the 0.3 inch required to extend the spring 122 requires a total retraction of the plunger 92 on the order of 0.42 inch. Plunger retraction for such a great distance requires considerable time and results in lower solenoid forces. According to the present invention, however, the plunger 92 need not be retracted 0.3 inch to extend spring 122. As described hereinbefore, housing 202 preloads the spring 122 of FIG. 1 so that the spring 122 is already extended to provide a starting force of 5 pounds. Thus, when the solenoid is actuated the plunger is retracted approximately 0.120 inch so that jaws 26 and 24 engage therebetween an insert of thickness 0.005 inch, and then retracted further an additional 0.05 inch in order to extend the expansion spring 122 an amount sufficient to gain an additional 1 pound holding force. The 0.05 inch further expansion of springs 122 (equivalent to 1 pound force) and its preloaded expansion (equivalent to 5 pounds force) gives a total 6 pound holding force.

MISTAKE DETECTOR OPERATION

FIG. 12A shows the relative positions of the second jaw member 26 and the magnetic means 420, particularly magnets 422 and 424, with respect to the pivot point 222. As the formerly open second jaw member 26 pivoted about the pivot point 222 to assume the position of the jaw 26' shown by phantom lines in FIG. 10, thereby closing upon the insert $I_x$, the magnetic means 420 likewise pivoted about point 222 to assume the position of magnet holder 426' (also shown in phantom lines). Due to the Hall Effect, as the magnets 422 and 424 carried by holder 426 pivoted in the plane of their exposed polar faces about the pivot point 222, the flux density of their magnetic fields as detected by the sensor 412 changed. As the sensed flux of the resultant magnetic field changed, the voltage generated by the Hall Effect sensor 400 changed proportionally. In this regard, it is recalled that the sensor element 412 has a constant current applied thereto whereby the voltage generated across the electrical conductor included in the sensor element is proportional to the magnetic field flux in accordance with the well-known Hall Effect. The magnets 422 and 424, positionally biased by virtue of the resilient bracket 430, slid across the sensor 400 in accordance with a slide-by mode. In sliding by the sensor rather than approaching the sensor in a head-on mode, a constant spatial relationship is maintained between the plane of the exposed magnetic poles and the plane of the sensor element.

The biasing function performed by the resilient bracket 430 provides numerous advantages. For example, the bracket keeps the magnets 422 and 424 at a uniform spacing away from the sensor 412. If a uniform spacing were not maintained, the magnetic field experienced by the sensor 412 would not be uniform. The biasing of the bracket 430 against the magnets 422 and 424 also helps to keep out foreign particles such as dust. Moreover, the biasing overcomes problems which might arise due to the gripping of inserts of different dimensional tolerances.

As shown in FIG. 10, the pivoting of magnet holder 426 as the second jaw member 26 closer to engage an insert causes the imaginary line 436 to pivot to assume the position 436'. Recall that imaginary line 436 extends from the pivot point 222 to perpendicularly bisect the line 428 connecting the centers of magnets 422 and 424. Upon assuming the pivotal position in FIG. 10 as shown by the phantom lines, the point K' (the center of the magnetic field) at the intersection of lines 428' and 426' is displaced along the Y axis of FIG. 10 by a distance y from its prior position K (at the intersection of lines 428 and 426) when the second jaw member was open with respect to the first jaw member.

The distance y is related to the distance x separating the first and second jaw members by the expression $$x/y = f(AA/BB)$$

where AA is the distance from the pivot point 222 to the center of the magnetic field (point K) and where BB is the distance from the pivot point 222 to the point of the potential contact of the first and second jaw members. The value of the ratio x:y is thus a function of the ratio AA:BB. For the special case illustrated in FIG. 10 wherein the magnets 422 and 424 are arranged immediately next to one another (i.e. the magnets have edges practically touching at the point K) the above relationship becomes essentially linear over a portion of its range so that:

$$x/y \alpha AA/BB$$

Thus, the positioning of the magnets 422 and 424 relative to one another is a factor in determining the nature of the relationship.

In FIG. 9 the analog voltage output of the Hall Effect sensor 412 is seen as a function of insert thickness (i.e. the distance x separating the first and second jaw members at their point of potential contact). When the first jaw member 24 and the second jaw member 26 contact one another (i.e. the jaw is "closed" with no insert engaged therebetween), the analog voltage output is slightly less than 2 volts. When the distance x separating the jaw members 24 and 26 is about 0.1 inches, the sensor output voltage is in the neighborhood of 5.5 volts. From the graph of FIG. 9 it can be seen that a 0.004 inch change in insert thickness results in about a 200 milivolt increase in sensor output. The analog voltage output of the sensor 412 is applied on lead 416 to the circuit of FIG. 8.

The analog voltage output of sensor 412 on lead 416 is applied to the mistake indicating circuit 365. In this regard, the voltage output on lead 416 is applied both to the signal generating means 367 (the voltage divider network comprising resistors R16, R17, and R18) and to the comparing means 368 (i.e. to the non-inverting input terminal of OP AMP 480). Signal generating means 367 generates a first analog voltage signal on line 453 which is proportional to the analog voltage on lead 416. Signal generating means 367 also produces a second analog voltage signal at node 450 which is a fixed percentage greater than the voltage on line 453 and a third analog voltage signal at node 452 which is a fixed percentage less than the voltage on line 453. As seen hereinafter, voltages at nodes 450 and 452 are respectively used by the OP AMP 480 [to determine if none or too few articles (a "miss") are engaged by the gripper arm] and by the OP AMP 470 [to determine if too many articles (a "double") are engaged by the gripper arm]. In this regard, the non-inverting input terminal of OP AMP 470 receives the analog voltage signal from node 452 (which is a fixed percentage less than the voltage on line 453) and the inverting input terminal of OP AMP 480 receives the analog voltage signal from node 450 (which is a fixed percentage greater than the voltage on line 453).

The "miss" OP AMP 480 compares the calibrated analog reference voltage generated by the sample and hold circuit 369 to the voltage signal at node 450 (which is a fixed percentage greater than the voltage signal on line 453). The voltage signal at node 450 corresponds to a lower limit of acceptable jaw displacement. If the output voltage at node 450 is less than the reference voltage, the output terminal of OP AMP 480 goes true to indicate that too few inserts have been grabbed.

The "double" OP AMP 470 compares the calibrated analog reference voltage to the voltage signal at node 452 (which is a fixed percentage less than the voltage signal on line 453). The voltage signal at node 452 corresponds to an upper limit of acceptable jaw displacement. If the voltage at node 452 exceeds the reference voltage (by reason of too great a distance separating the gripper jaws 24 and 26), then the output terminal of OP AMP 470 goes true to indicate that too many inserts have been grabbed. The values of resistors R16 and R17 are so chosen that the voltages at nodes 450 and 452 are at fixed percentages above and below, respectively, the voltage signal on line 453 to provide an acceptable tolerance range for insert thicknesses.

At a point in the machine cycle at which the distance x separating the gripper jaw members 24 and 26 is to be checked (and thus the thickness of the insert/inserts engaged therebetween), a timing pulse is applied on lead 468 to the flip-flops 472 and 482. If either flip-flop 472 or 482 is receiving a true signal at its data input pin when a timing pulse is received, the Q output pin of the respective flip-flop goes true so as to ultimately activate an appropriate LED indicative of the detected condition. If, for example, OP AMP 470 had a true output when flip-flop 472 receives a timing pulse, the Q output pin goes true so that a true signal is applied to inverting driver 474. The output of driver 474 goes false, so that LED 476 is activated to give a visible indication that a "double" occurred. Once the mistake indicator is observed and rectified, the operator can reset the flip-flop by causing a reset pulse to be applied on lead 477.

It has been mentioned earlier that the sample and hold circuit 369 generates a calibrated analog voltage signal for application to the OP AMPs 470 and 480. The calibrated reference voltage is generated when an operator (1) verifies (during a portion of the machine cycle in which the gripper arm of the insert station is to grab an insert) that the gripper jaw elements 24 and 26 are separated by the proper distance x (taking into consideration the number of inserts to be engaged and the thickness of each engaged insert); (2) closes the calibration switch 467; and, (3) then opens the calibration switch 467. When the switch 467 is closed the voltage signal at node 451 is applied to the non-inverting terminal of OP AMP 456. The circuit 369 holds the voltage at node 451 in binary form but provides an analog output from OP AMP 464 which is used as the calibrated analog reference voltage until the switch 467 is again closed for another calibration. Thus, the present invention provides a mistake detector that can be very easily and accurately calibrated.

From the foregoing it is seen that the present invention provides a method of easily calibrating the mistake detectors associated with each of the plurality of gripper arms positioned along a raceway of a multi-station insertion machine. In this respect, a lay operator who need not be a skilled technician can simply and quickly calibrate the mistake detectors for each gripper arm. The lay operator need only approach insert station S1; load the desired type of inserts into the hopper associated with insert station S1; jog the insertion machine 10 through a portion of machine cycle during which time the operator can verify whether gripper arm 161 is properly engaging an appropriate number of inserts $I_1$ at station S1 (meaning that gripper jaw elements 24 and 26 are separated by the proper distance during a portion of the machine cycle wherein the jaws engage the proper number of inserts); close the calibration switch 467; and, then open the calibration switch 467. The lay operator then moves to insert station S2; loads the desired type of inserts into the hopper associated with insert station S2; jogs the machine 10 through a second machine cycle to verify the engagement of gripper arm 162 of a proper number of inserts I2; closes the calibration switch associated therewith; and, closes the associated calibration switch. The lay operator then moves to insert station S3 whereat analogous steps are performed, and so on according to the number of insert stations provided with the particular machine being used.

An alternative approach for calibrating the mistake detectors associated with each of the plurality of gripper arms is for the lay operator to load each insert station S1, S2, and S3 with its respective inserts. The operator then jogs the insertion machine through a portion of the machine cycle during which time each gripper arm engages its respective insert. The operator then stops the machine and inspects each gripper arm to verify that a proper number of inserts are engaged by each gripper arm. If all gripper arms are engaging the proper number of inserts, the operator then closes a master calibration switch (MCS) which closes the calibration switch for each insert station S1, S2, and S3. A sequence of closing and then opening the master calibration switch enables each sample and hold circuit to hold its calibrated analog reference voltage until another calibration operation occurs.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A gripper arm for selectively engaging and retrieving articles from a station proximate the gripper arm, said gripper arm comprising:
   a gripper arm housing having a first end and a second end, said gripper arm housing having two parallel panels which define a space therebetween;
   means at the second end of said housing for securing said gripper arm to oscillating drive means;
   a first jaw member proximate said first end of said gripper arm housing;
   a second jaw member proximate said first end of said gripper arm housing, said second jaw member being selectively movable with respect to said first jaw member for the engagement of articles therebetween;
   actuation means for selectively moving said second jaw member with respect to said first jaw member whereby articles are selectively engaged between said jaw members; and,
   means for detecting whether a proper number of articles are engaged between said first jaw member and said second jaw member of said gripper arm, said detecting means comprising:
   means for creating a magnetic field, said magnetic field-creating means being mounted on one of saw jaw members;
   Hall Effect sensor means for sensing the flux density of said magnetic field and for generating an output signal proportional thereto, said sensor means being mounted with respect to the other of said jaw members; and,
   biasing means for biasing said magnetic field-creating means relative to said sensor means whereby a first plane including an essentially planar surface of said magnetic field-creating means remains in a predetermined relationship with respect to a second plane including an essentially planar surface of said sensor means in a manner whereby slidable displacement occurs between said field-creating means and said sensor means as said second jaw member is moved with respect to said first jaw mcmber, said field-creating means and said sensor means being positioned in said space defined by said gripper arm housing panels and mounted relative to said jaw members in a manner whereby said output signal of said sensor means is related to the distance separating said first and second jaw members as said slidable displacement occurs.

2. The gripper arm of claim 1, wherein said magnetic field-creating means is mounted on said second jaw member, and wherein said second jaw member is adapted to be selectively movable with respect to said first jaw member whereby said essentially planar surface of said magnetic field-creating means travels essentially in the plane in which it is included when said second jaw member is in motion.

3. The gripper arm of claim 1, wherein said magnetic field-creating means comprises an exposed North pole and an exposed South pole, both of said exposed poles being oriented toward said sensor means.

4. The gripper arm of claim 1 wherein said second jaw member pivots about a pivot point in relation to said first jaw member, and wherein the distance x separating said jaw members at their point of potential contact expressed by the relationship $$x = f[(A/B)y]$$

wherein:
y is the magnitude of the voltage generated by said sensor means;
A is the distance from said pivot point to the center of said field; and,
B is the distance from said pivot point to said point of potential contact of said jaw members.

5. The gripper arm of claim 1, wherein said means for using the magnitude of said sensor-generated signal as an indication further comprises:
means for generating and storing a calibrated reference voltage;
means for generating a first voltage signal having a magnitude proportional to said sensor-generated signal;
means for generating a second voltage signal having a magnitude a fixed percentage greater than the magnitude of said first voltage signal; and,
comparison means for determining if the magnitude of said calibrated reference voltage exceeds the magnitude of said second voltage signal thereby indicating that too few articles are engaged between said jaw members.

6. The gripper arm of claim 5 wherein said means for generating and storing a calibrated reference voltage sample and hold means which uses the magnitude of said first voltage signal when a proper number of articles are known to be engaged between said jaw members and produces an analog voltage thereto for use as said calibrated reference voltage.

7. The gripper arm of claim 1, wherein said means for using the magnitude of said sensor-generated signal as an indication further comprises:
means for generating and storing a calibrated reference voltage;
means for generating a first voltage signal having a magnitude proportional to said sensor-generated signal;
means for generating a third voltage signal having a magnitude a fixed percentage less than the magnitude of said first voltage signal; and,
comparison means for determining if the magnitude of said calibrated reference voltage is exceeded by the magnitude of said third voltage signal thereby indicating that too many articles are engaged between said jaw members.

8. The gripper arm of claim 7 wherein said means for generating and storing a calibrated reference voltage comprises voltage sample and hold means which uses the magnitude of said first voltage signal when a proper number of articles are known to be engaged between said jaw members and produces an analog voltage related thereto for use as said calibrated reference voltage.

9. The gripper arm of claim 1, further comprising:
means for storing a reference signal proportional to the displacement of the gripper jaws when a proper number of documents are engaged by the gripper arm and for determining if an electrical signal generated by the sensor means is within predetermined limits of the stored reference signal so as to determine of the proper number of documents are engaged by the gripper arm.

10. The detector of claim 9, further comprising:
signal generating means connected to said sensor means, said signal generating means being adapted to generate first, second, and third voltage signals, said first voltage signal having a magnitude proportional to said sensor-generated signal, said second voltage signal having a magnitude a fixed percentage greater than the magnitude of said first voltage signal as a representation of a lower limit of acceptable jaw displacement, said third voltage signal having a magnitude a fixed percentage less than the magnitude of said first voltage signal as a representation of an upper limit of acceptable jaw displacement.

11. The detector of claim 10, wherein said first voltage signal is applied to said reference storage means.

12. The detector of claim 10, wherein said means for determining if the electrical signal generated by said sensor means is within predetermined limits of the stored reference signal includes comparison means, said comparison means comprising:
first comparator means for determining if the magnitude of the stored reference signal exceeds the magnitude of said second voltage signal as an indication that too few documents are engaged; and,
second comparator means for determining if the magnitude of the stored reference signal is exceeded by the magnitude of the third voltage signal as an indication that too many documents are engaged.

13. The gripper arm of claim 1, wherein said sensor means is mounted on one of said gripper arm housing side panels, and wherein said field-creating means is mounted to be selectively movable with said second jaw member in a manner whereby said slidable displacement occurs in accordance with the selective movement of said second jaw member.

14. The gripper arm of claim 13, wherein said field-creating means is carried on a resilient mounting bracket which is selectively movable with said second jaw member, and wherein said mounting bracket biases said field-creating means against said sensor means.

15. The gripper arm of claim 1, wherein said field-creating means comprises a mounting bracket which carries an exposed magnetic North pole and an exposed magnetic South pole, said mounting bracket being selectively movable with said second jaw member.

16. The gripper arm of claim 15, wherein said magnets are disc-shaped magnets having their circumferences in close proximity with one another.

17. A method of operating a gripper arm of an insertion machine in a manner to determine whether a proper number of articles are engaged between first and secnd jaw members comprising said gripper arm, said method comprising the steps of:
oscillating said gripper arm whereby said gripper arm approaches a hopper whereat an article is stored;
creating a magnetic field by using field-creating means, said field-creating means being mounted with respect to one of said jaw members and positioned in a space defined between two parallel panels of said gripper arm housing;
biasing said magnetic field-creating means with respect to Hall Effect sensor means, said Hall Effect sensor means also being positioned in said spaced defined by said gripper arm housing panels, said biasing occurring in a manner whereby a first plane included in an essentially planar surface of said magnetic field-creating means remains in a predetermined relationship with respect to a second plane including an essentially planar surface of said sensor means, said first and second planes being parallel to one another and whereby slidable displacement can occur between said field-creating means and said sensor;

activating actuation means whereby said second jaw member moves toward said first jaw member in a manner whereby slidable displacement occurs between said field-creating means and said sensor and whereby said hopper-stored article is engaged between said first jaw member and said second jaw member;

sensing the flux density of said magnetic field using said Hall Effect sensor means when an ariticle is engaged between said first jaw member and said second jaw member, said Hall Effect sensor means being mounted with respect to the other of said jaw members in a manner suitable for sensing any change in displacement of the jaw members relative to one another;

generating an output signal proportional to said sensed field flux density; and, using the magnitude of said output signal as an indication of whether a proper number of articles are engaged between said first and second jaw members.

18. The method of claim 17, wherein said field-creating means comprises an exposed magnetic North pole and an exposed magnetic South pole, both of said exposed poles being oriented toward said sensor means.

19. The method of claim 17, wherein the step of using the magnitude of said generated output signal as an indication further comprises the steps of:
generating and storing a calibrated reference voltage;
generating a first voltage signal having a magnitude proportional to said sensor-generated signal;
generating a second voltage signal havng a magnitude a fixed percentage greater than the magnitude of said first voltage signal; and,
determining if the magnitude of said calibrated reference voltage exceeds the magnitude of said second voltage signal thereby indicating that too few articles are engaged between jaw members.

20. The method of claim 19, wherein the step of generating and storing a calibrated reference voltage comprises using sample and hold means which uses the magnitude of said first voltage signal when a proper number of articles are known to be engaged between said jaw members and produces an analog voltage related thereto for use as said calibrated reference voltage.

21. The method of claim 17, wherein the step of using the magnitude of said sensor-generated output signal as an indication further comprises the steps of:
generating and storing a calibrated reference voltage;
generating a first voltage signal having a magnitude proportional to said sensor-generated signal;
generating a third voltage signal having a magnitude a fixed percentage less than the magnitude of said first voltage signal; and,
determining if the magnitude of said calibrated reference voltage is exceeded by the magnitude of said third voltage signal thereby indicating that too many articles are engaged between said jaw member.

22. The method of claim 21, wherein the step of generating and storing a calibrated reference voltage comprises using sample and hold means which uses the magnitude of said first voltage signal when a proper number of articles are known to be engaged between said jaw member and produces an analog voltage related thereto for use as said calibrated reference voltage.

23. The method of claim 17, further comprising the step of:
storing a reference signal proportional to the displacement of the gripper jaws when a proper number of documents are engaged by the gripper arm and determining if an electrical signal generated by the sensor means is within predetermined limits of the stored reference signal so as to determine if the proper number of documents are engaged by the gripper arm.

24. The method of claim 23, further comprising:
using signal generating means connected to said sensor means for generating first, second, and third voltage signals, said first voltage signal having a magnitude proportional to said sensor-generated signal, said second voltage signal having a magnitude a fixed percentage greater than the magnitude of said first voltage signal as a representation of a lower limit of acceptable jaw displacement, said third voltage signal having a magnitude a fixed percentage less than the magnitude of said first voltage signal as a representation of an upper limit of acceptable jaw displacement.

25. The method of claim 24, wherein said first voltage signal is applied to reference storage means.

26. The method of claim 24, wherein said step for determining if the electrical signal generated by said sensor means is within predetermined limits of the stored reference signal includes the steps of:
using first comparator means for determining if the magnitude of the stored reference signal exceeds the magnitude of said second voltage signal as an indication that too few documents are engaged; and,
using second comparator means for determining if the magnitude of the stored reference signal is exceeded by the magnitude of the third voltage signal as an indication that too many documents are engaged.

* * * * *